July 31, 1951 W. WOCKENFUSS 2,562,253
PRINTING MECHANISM FOR TABULATORS
Original Filed March 4, 1948 10 Sheets-Sheet 1

INVENTOR.
William Wockenfuss,
BY
Edward L. Mueller
ATTORNEY

INVENTOR.
*William Wockenfuss,*
BY

*ATTORNEY*

INVENTOR.
William Wockenfuss,
BY
ATTORNEY

July 31, 1951   W. WOCKENFUSS   2,562,253
PRINTING MECHANISM FOR TABULATORS
Original Filed March 4, 1948   10 Sheets-Sheet 5

INVENTOR.
William Wockenfuss,
BY
Edward L. Mueller
ATTORNEY

July 31, 1951   W. WOCKENFUSS   2,562,253
PRINTING MECHANISM FOR TABULATORS
Original Filed March 4, 1948   10 Sheets-Sheet 6
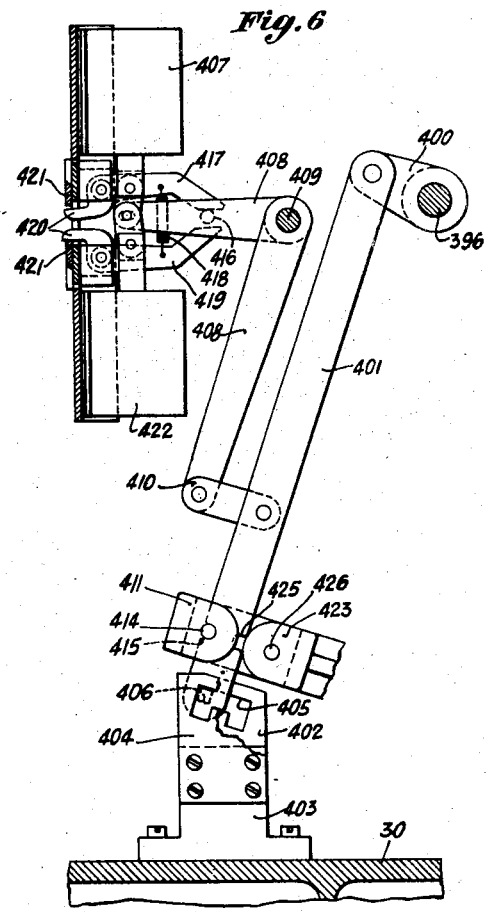
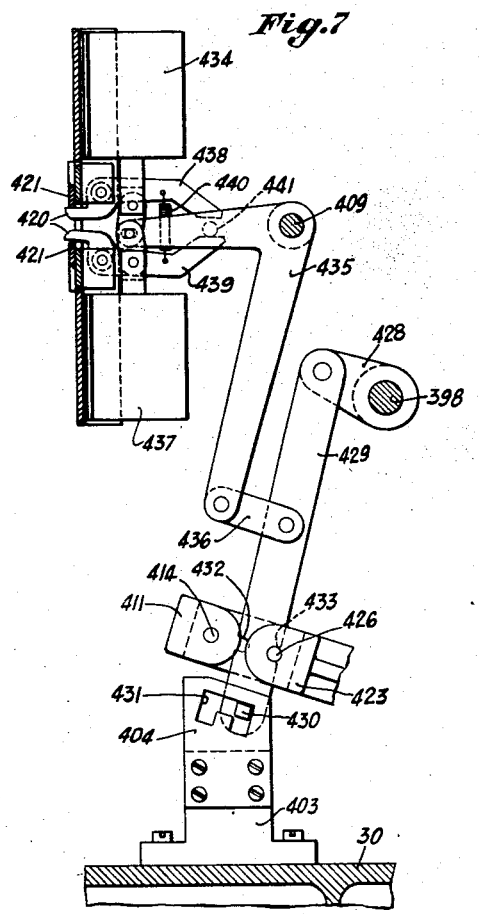
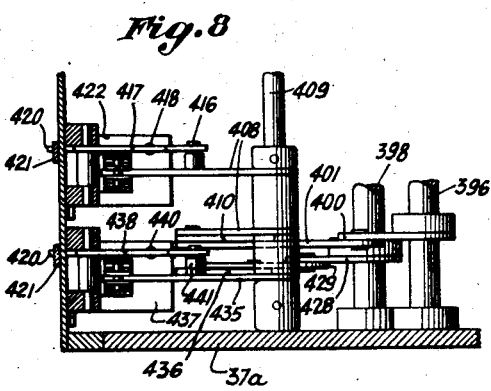
INVENTOR.
William Wockenfuss,
BY
ATTORNEY July 31, 1951  W. WOCKENFUSS  2,562,253
PRINTING MECHANISM FOR TABULATORS
Original Filed March 4, 1948  10 Sheets-Sheet 7

INVENTOR.
William Wockenfuss,
BY
Edward L. Mueller
ATTORNEY

July 31, 1951 W. WOCKENFUSS 2,562,253
PRINTING MECHANISM FOR TABULATORS
Original Filed March 4, 1948 10 Sheets-Sheet 8

INVENTOR.
William Wockenfuss,
BY
ATTORNEY

July 31, 1951   W. WOCKENFUSS   2,562,253
PRINTING MECHANISM FOR TABULATORS
Original Filed March 4, 1948   10 Sheets-Sheet 9
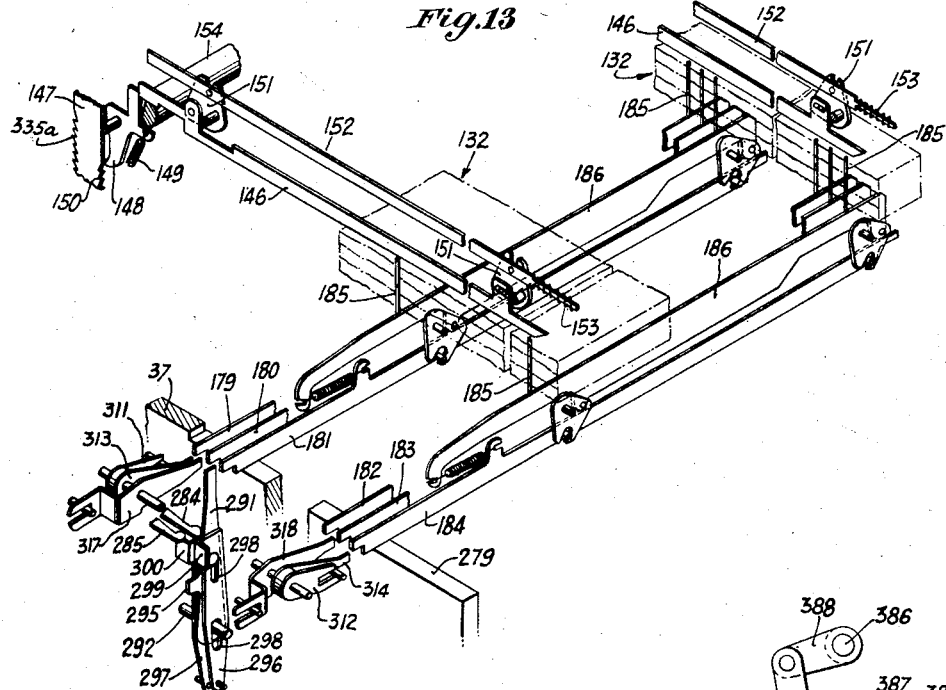
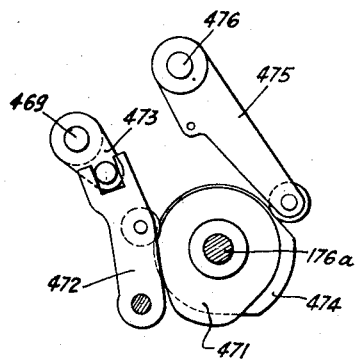
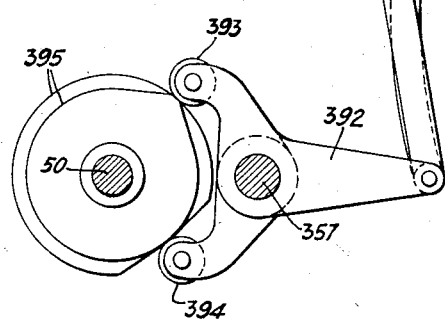
INVENTOR.
William Wockenfuss,
BY
Edward L. Mueller
ATTORNEY

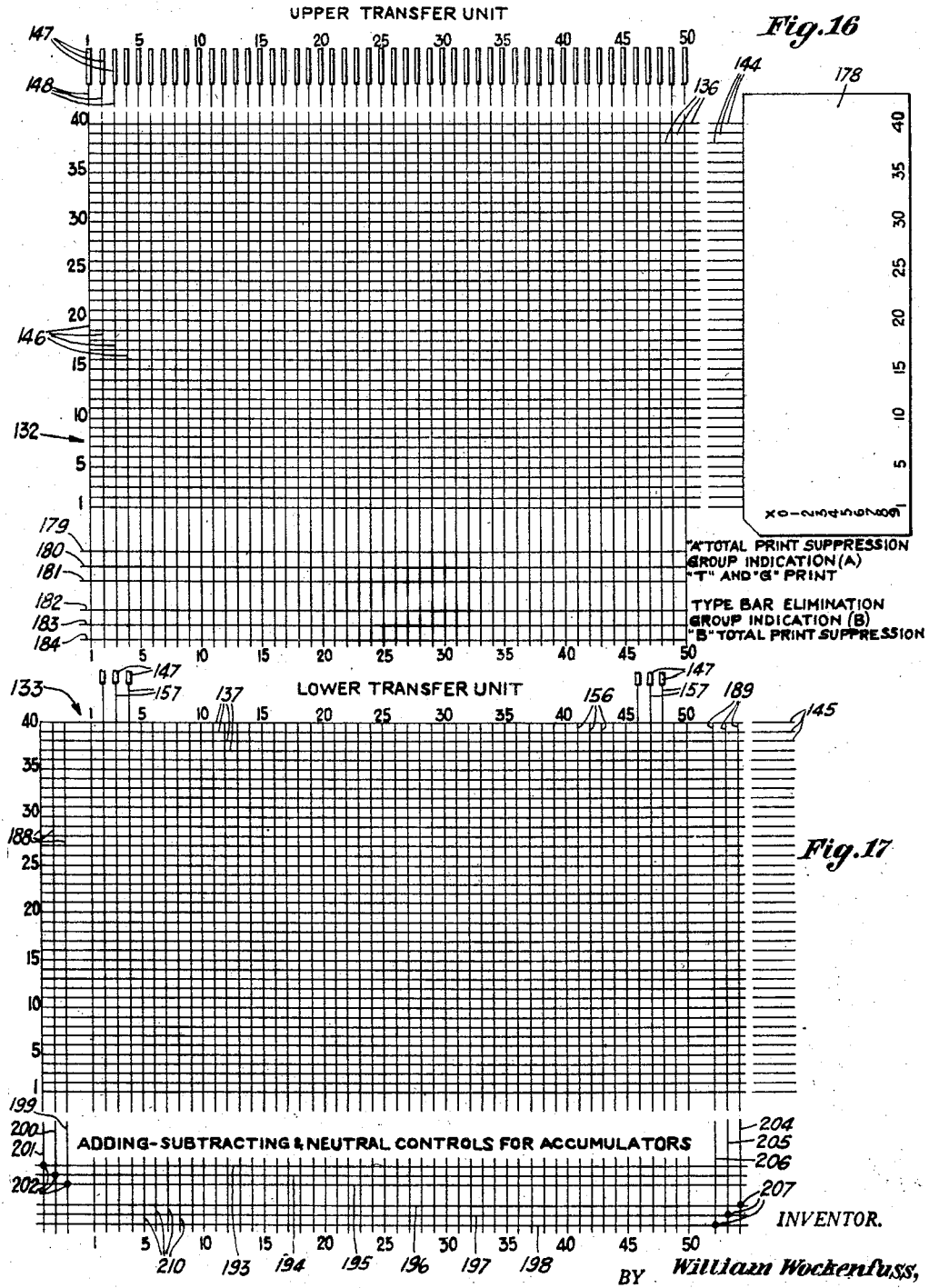

Patented July 31, 1951

2,562,253

UNITED STATES PATENT OFFICE 2,562,253

PRINTING MECHANISM FOR TABULATORS

William Wockenfuss, Union, N. J., assignor to Control Instrument Company, Inc., Brooklyn, N. Y., a corporation of New York Original application March 4, 1948, Serial No. 13,017. Divided and this application July 21, 1949, Serial No. 113,261

15 Claims. (Cl. 235—61.9)

This invention relates to improvements in record controlled tabulators and has particular reference to a printing mechanism therefor, the present disclosure being a division of my co-pending application Serial No. 13,017, filed March 4, 1948.

An object of the invention is to provide an improvide mechanism wherein the type bars of the tabulators are variously controlled, during the total-taking cycle and in conjunction therewith, to effect such operations as type bar elimination, sub-total print suppression, the printing of group indications and of designations representing the types of totals being taken.

The above and other objects will appear more clearly from the following detailed description when taken in connection with the accompanying drawings which illustrate a preferred embodiment of the inventive idea; but it is to be expressly understood that said drawings are employed merely for the purpose of facilitating the description of the invention as a whole and not to define the limits thereof, reference being had to the appended claims for this purpose.

In the drawings:

Fig. 6 is a fragmentary elevation, partly in section, of the control mechanism for the upper, sub-total accumulators;

Fig. 7 is a similar view of the control mechanism for the lower, grand total accumulators;

Fig. 8 is a fragmentary plan view, partly in section and taken on the line 10c—10c of Fig. 4;

Fig. 13 is a fragmentary isometric view of the control mechanism for the auxiliary section of the upper transfer unit;

Fig. 14 is an elevation of a portion of the hammer control mechanism;

Fig. 15 is an elevation of a portion of the accumulator operating mechanism;

Fig. 16 is a diagrammatic view of the upper transfer unit and certain associated parts; and Fig. 17 is a similar view of the lower transfer unit.

Figure 1:
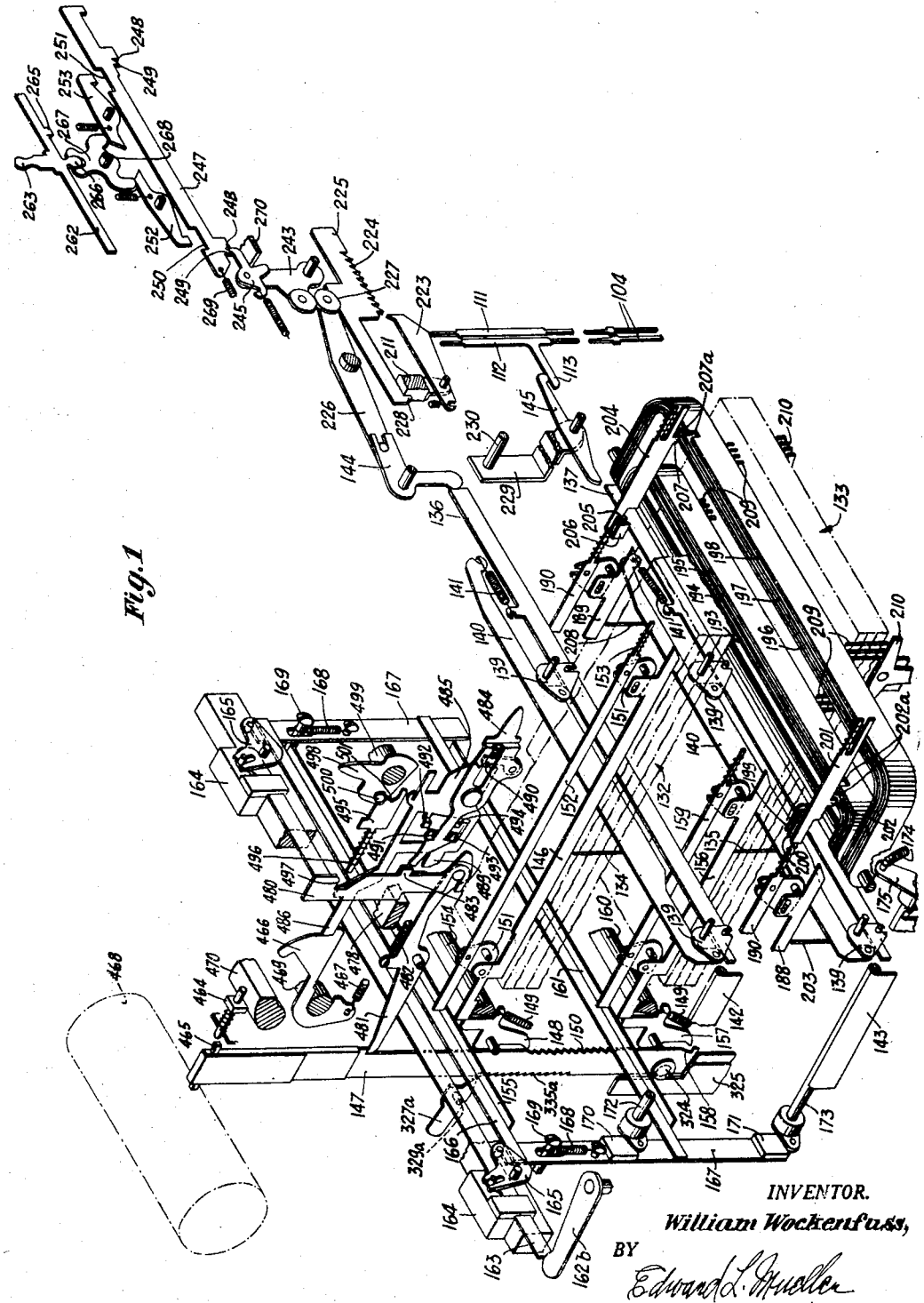
Fig. 1 is a fragmentary isometric view showing portions of the analyzing and change of designation mechanisms in conjunction with the upper and lower transfer units and the printing mechanism controlled thereby.

The drawings illustrate only so much of the card analyzing and change of designation mechanisms of the tabulator as will enable a full understanding of the control of the print section thereof embodying the features of the present invention, reference being had to said co-pending application for a complete disclosure of said mechanisms. Thus, in Fig. 1, the numeral 104 indicates the sensing pins which are carried in a lower vertically reciprocating pin box at each of two analyzing stations as cards are fed thereto and at which comparison is made between the cards at said stations to determine whether the card feed is to proceed or a total-taking cycle is to be initiated, it being understood that there is a row of said pins at each station for each column of a card to be analyzed. At each station, rows of analyzing pins 111 mounted in upper stationary pin boxes are elevated by those pins 104 which sense perforations in a card and, at the one station partially shown, an additional control pin 112 in each row and having an extension 13 thereon is adapted to be elevated by its associated pin 104, when sensing a control hole in a card, to actuate a lever 145 carried by an oscillatory bail 229 mounted on a shaft 230 so as to operate an aligned cross bar 137 of the lower transfer unit generally indicated in dot and dash lines at 133, as will more fully appear hereinafter. The elevation of said pins 111 is sensed by a scanning device comprising a reciprocating frame 211. Said device includes a sensing pawl 223 for each row of pins 111 at each of the two analyzing and comparing stations, and when said pawl is tripped by an elevated pin it is caused to engage one of the teeth 224 of a slide 225, whereupon continued movement of the frame 211 will carry the slide with it. As said slide is moved, it rocks a lever 226 having one end engaged in a recess 227 in the slide and its other end connected to a bell crank 144. Rocking of said lever actuates the bell crank to operate an aligned cross bar 136 of the upper transfer unit generally indicated at 132 to accomplish functions hereinafter described. When the frame 211 is returned to its starting position, it engages the lips 228 of any slides 225 which have been advanced and returns these slides to the position shown.

Rocking of the lever 226 is also utilized to control a change of designation mechanism by which the card feed is stopped and a total-taking cycle is initiated when cards being sensed at the two analyzing stations do not compare in their group indications. Briefly, when cards at the two stations compare, similar pawls 223 at said stations are operated simultaneously by corresponding pins 111 thereat, whereas if the cards do not compare, the pawls 223, and consequently, their slides 225 and associated levers 226, are operated successively and this results in the initiation of a total-taking cycle in conjunction with which the operations of the present invention are accomplished. Each pair of levers 226 (only one of which is shown) at the two analyzing stations, when rocked either simultaneously or successively, operates a pair of bell cranks 243 and the latter elements carry spring urged pawls 245 with which is associated an analyzer controlled slide 247 that responds to the operation of said pawls with primary and secondary movements in the same direction, only the secondary movement occurring when there is a change of designation. At each end of said slide the same is provided in its lower edge with a pair of teeth 248, 249, the former of which are engaged by the two pawls 245 at the two analyzing stations during normal condition of the control mechanism, and also during the primary movement of the slide 247 if both said pawls are operated simultaneously. The upper edge of each slide is provided with elongated slots 250, 251 with which are associated, respectively, the actuating members 252 and 253 in the form of a pair of spring urged levers that normally assume the position shown in the drawing in which their outer extremities are out of the slots 250, 251. Said levers, when actuated in a manner to presently appear, each controls a switch, shown in said copending application, by means of which the operation of the change of designation mechanism is initiated to cause the taking of one of two types of sub-totals which are herein designated as A and B.

To establish a predetermined set-up in the change of designation control mechanism with respect to two or more different fields of the cards which are allotted for A and B totals, there is provided a selector device for each pair of actuating members 252, 253 and which comprises a slide 262 individual to one of the card columns. Each slide has a key 263 by means of which it may be adjusted, from the neutral position shown, to the left or right depending upon whether the card column to which the slide is individual is in a field from which A or B totals, respectively, are to be taken. Each slide 262 is provided on its lower edge with a guide lug 265 and a projection 266, the latter engaging in a recess in a rocker member 267 mounted for rocking movement, together with similar members, on a common shaft 268. The two lower extremities of the rocker member 267 engage the inner adjacent ends of the associated levers 252, 253 and control the positions of said levers with respect to the slots 250, 251 in the slide 247.

In adjusting the selector device preliminary to a machine operation, if the slide 247 assigned to any column of a card is not to be involved in the taking of an A or B total, its associated slide 262 remains in, or is adjusted to, the neutral position so that the rocker member 267 and the levers 252, 253 will assume the position shown wherein said levers will be unaffected by either the primary or secondary movements of the slide 247, which movements are under the influence of the slides 225 at the two analyzing stations. To adjust said slide 247 for the taking of an A total, the corresponding key 263 is shifted to the left, thereby rocking the member 267 counterclockwise to depress the inner end of the lever 252 and release the corresponding end of the lever 253 whose outer end then enters the right hand extremity of the slot 251 in the slide 247. From this it will be apparent that an adjustment to the right hand position of the key 263 associated with another slide 247 assigned to B total-taking, will effect a reversal of the operation just described so that the outer end of the lever 252 will be positioned in the right hand extremity of the slot 250 of said slide.

Assuming that two cards at the analyzing stations have the same group designations, the pawls 223 will be raised simultaneously by the elevated pins 111 to engage corresponding teeth in the two slides 225, with the result that said slides will be moved from their normal positions at the same time and thus simultaneously rock the bell cranks 243. This operation causes the pawls 245 to impart only the primary movement to the slide 247 against the tension of its return spring 269. With the outer end of one or the other levers 252, 253 in the right hand extremity of its associated slot 250 or 251, the latter are of such length that, at the conclusion of said primary movement, the left hand extremities of said slots will only reach, but will not move, the levers 252, 253 and, therefore, neither of the levers will be operated to close their associated and previously mentioned switches. Should non-corresponding pins at the two analyzing stations be elevated, indicating a change of designation of the cards, either one or the other of the pawls 223 will be raised first to operate its slide 225 with the result that the associated bell crank 243 will be actuated to cause its pawl 245 to move the slide 247 through its primary movement. The other pawl 245 not then actuated will engage the associated second tooth 249 of said slide preparatory to moving the latter through its secondary movement when the bell crank on which said other pawl is mounted is operated by the lifting of the other pawl 223 when it comes in contact with one of the pins 111 following the operation of the first of said latter pawls. The secondary movement of the slide 247 will actuate a lever 253 or 252, depending upon whether an A or B total is to be taken, and the actuation of said lever will result in the closing of the associated switch to thereby stop the card feed section of the machine for one cycle and initiate a total-taking operation in the manner fully described in the parent application. Upon conclusion of the described operation and while the scanning frame 211 is being restored to its starting position, the restoring bail 270 is reciprocated in timed relation with the movement of said frame to trip the pawls 245 so as to disengage them from the teeth of the slide 247 which then restores to its normal position under the influence of its spring 269. It will now be apparent that the taking of an A or B total will be controlled from either of the two analyzing stations, depending upon the relative positions of the elevated pins 111 at said stations and also upon the pre-selection of either of the levers 252 or 253, for operative association with the slide 247.

*Transfer units*

The pins 111, 112 of the analyzing station fragmentarily shown in Fig. 1 are designed, respectively, to control the operations of the upper and lower transfer units 132, 133, which units are slidably mounted between the walls 35 and 37 so that the same may be withdrawn outwardly and opened for the removal and insertion of different set-up devices each individual to a particular type of report analysis and each of which controls the operative and inoperative positions of the lower sections of the rows of sectional transfer pins generally indicated at 134, 135 in the respective units. The previously mentioned actuating bars 136, 137 associated, respectively, with the upper and lower transfer units have only linear movements responsive to the elevation of the pins 111 or 112 and each set of bars 136, 137, in which there is a bar for each card column, is carried in a frame 138 secured between the walls 35, 37 and each bar is, as best shown in Fig. 1, connected by links 139 to an associated transfer pin elevating bar 140 in such manner that a linear movement of a bar 136, 137 will impart to its bar 140 a practically direct upward movement. Restoration of the bars 136, 137, and therefore the bars 140, may be accomplished by springs 141, connecting each pair of bars and, in order to provide a more positive restoration to insure that none of the bars 140 in either set will be in the path of horizontal movements of the transfer pins 134, 135 when either transfer unit 132 or 133 is withdrawn outwardly from its operative position, restoring bails 142 and 143 located at the left hand extremities of said bars 136 and 137 are adapted to be operated, in a manner to later appear, to reverse the initial linear movements of said bars to return them to normal. In so doing, the links 139 will operate to positively lower both sets of bars 140 so that their upper edges will be below the lower extremities of the transfer pins in the respective units 132, 133 with which they are associated. The restoration of the actuated bars 136 to normal will cause them to also restore the bell cranks 144 and their associated levers 226, this restoration occurring after the scanning frame 211 has completed its secondary movement and has returned to its starting position, as previously described.

*Main type bar control by transfer units*

Cooperating with the lower bars 136 of the upper transfer unit 132 is a set of control bars 146 arranged in crossed relation to the bars 136, 140; there being one bar 146 for each of the vertically movable type bars 147 in the machine, and each bar 146 is located directly over and in contact with a column of pins 134 so as to be elevated by any active pin in said column when the lower bar 140 engageable with said pin is raised. The elevation of a bar 146 takes place immediately upon the sensing of a hole in a card at the analyzing station partially shown in Fig. 1, and during the upward movement of the type bars 147. Elevation of said bar 146 disengages it from the associated type bar-arresting pawl 148 so that the latter will, under the influence of its spring 149, engage the proper tooth 150 of its type bar so as to arrest the same in position to print the value represented by said tooth when the printing mechanism of the machine is operated. Each bar 146 is connected by links 151 to a slidable bar 152 having a spring 153 thereon which is compressed by the elevation of said bar 146 and the resulting sliding movement of the bar 152, and said spring later acts to restore the bars 152 and 146 just prior to the restoration of the pawl 148 by an oscillatory bail 154 upon which the adjacent ends of the bars 146 rest and which is common to all said pawls. To insure a more positive lowering of the bars 146, a vertically movable bail 155 common to and located above said bars and co-acting with the springs 153, is lowered at the proper moment in the cycle of operation to engage and force said bars downwardly to the position in which they will be engaged by the pawls 148, which have already been restored by the bail 154, to withhold said pawls from the teeth 150.

A similar arrangement for the lower transfer unit 133 includes the upper cross bars 156 engageable with the transfer pins 135 and which control, by their elevation under the influence of said pins, the release of the lower type bar-arresting pawls 157 for engagement each with the tooth 158 at the lower end of its associated type bar, and each of said bars 156 is linked to a bar 159 similar to the bars 152. A bail 160, similar to the bail 154 and operated therewith, restores all operated pawls 157; and a bail 161, like the bail 155 and also operated therewith, provides for the positive restoration of the lower control bars 156.

Figure 2:
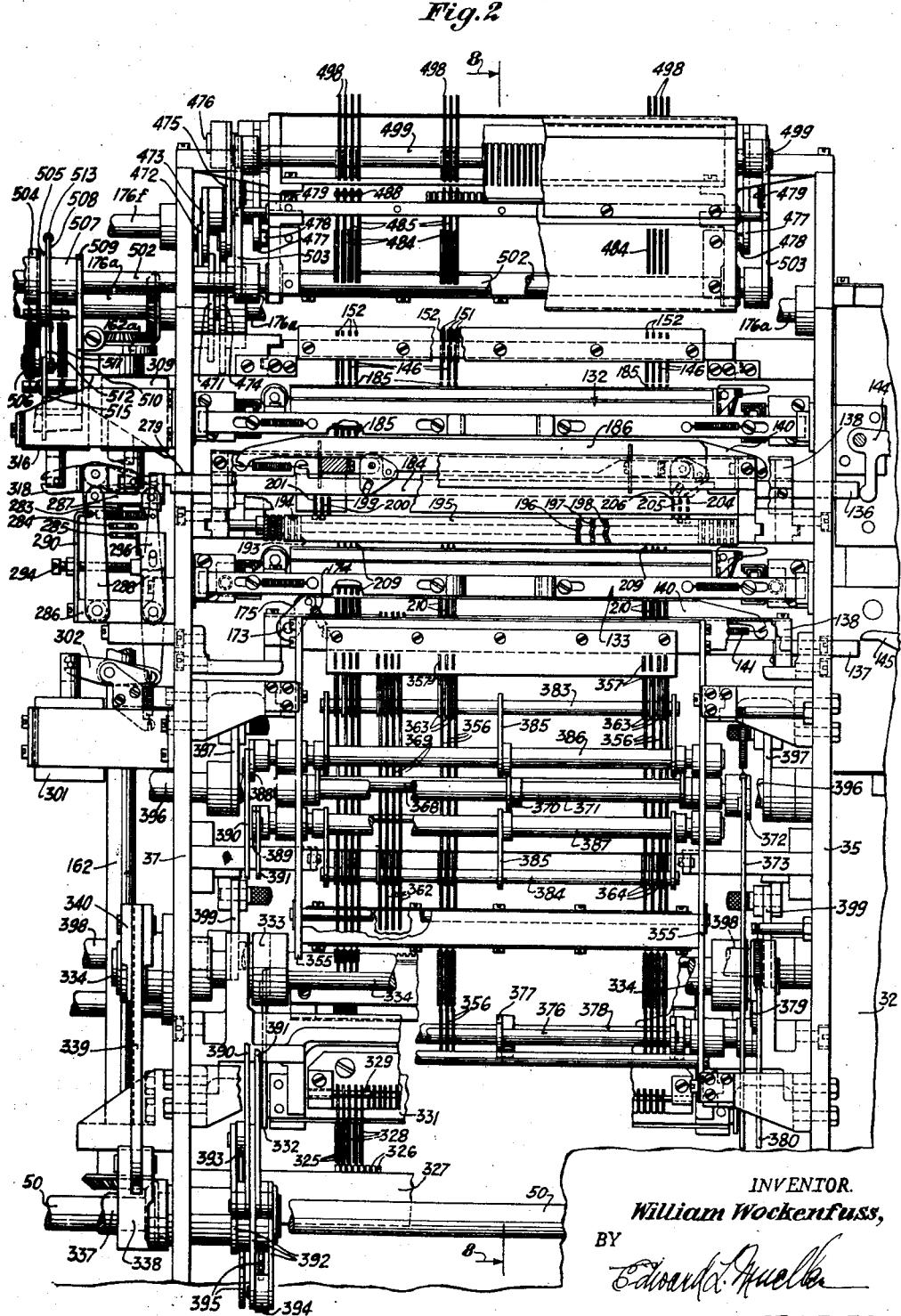
Fig. 2 is a front elevation of the printing section of the tabulator with parts broken away.

As shown in Figs. 1 and 2, the restoring bails 142, 143, 155 and 161 are all controlled from the secondary cam shaft 162 geared to the main cam shaft 50 and which carries adjacent its upper end a cam 162a that operates a lever 162b, and when said lever is operated it shifts a slide 163 (Fig. 1) mounted in stationary blocks 164 adjacent opposite ends of the slide. Links 165 controlled by said slide depress a frame 166 having depending arms 167 at each end thereof and which frame carries the two bails 155 and 161 so that they will be lowered with the frame to perform their respective restoring functions. The downward movement of the frame 166 is against the tension of springs 168 connecting the arms 167 to fixed pins 169 so that said frame will be raised at the conclusion of the restoring operation and thus reverse the movements of the slide 163 and lever 162b. Abutments 170 and 171 on one of the arms 167 turn the shafts 172 and 173 which carry, respectively, the bails 142 and 143 so that the latter will be operated to restore the bars 136 and 137 when the frame 166 is lowered. Upon upward movement of said frame, the shaft 173 and its bail 143 are restored by a spring 174 connected to a crank 175 on one end of said shaft, and the shaft 172 and its bail 142 are restored by a similar spring urged crank 176, shown in dotted lines in Figs. 3 and 4.

The oscillatory restoring bails 154 and 160 for the type bar pawls 148 and 157 are controlled from the counter shaft 176a (see Figs. 4 and 5) which is journaled in the walls 35, 37 and 37a and is geared to the upper end of the cam shaft 162. A cam 176b on the shaft 176a causes the rise and fall of the arm 176c secured on a rock shaft 176f and having its free end joined to the depending links 176d and 176e connected, respectively, to the extensions 154a and 160a of the bails 154 and 160. This assemblage operates to rock said bails to restore the pawls 148 and 157 at the instance before the vertically movable bails 155 and 161 operate to lower the control bars 146 and 156 to thus enable the latter to reengage said pawls to retain them in non-arresting position until the next cycle of operation.

*Auxiliary controls by upper transfer unit*

Thus far, it is apparent that with respect to the upper transfer unit 132, the number of analyzer controlled bars 136 associated therewith is equal to the number of columns in a card and that there is a control bar 146 for every type bar 147, which bars 136 and 146 are utilized for the transmission of data interpreted from the cards by the analyzer unit. It will also be understood that, within the transfer unit 132, there is a sectional transfer pin 134 at each point of intersection of the crossed bars 136, 146, which pins are adapted to be adjusted to operative or active position or permitted to remain inoperative under the control of the set-up device or plate previously mentioned and shown at 177 in Fig. 3.

Referring now to Fig. 16 wherein a card 178 is shown in association with the upper transfer unit so as to illustrate the actual relationship of the parts during the machine operation, and in which some of the parts thus far described are illustrated diagrammatically, it will be seen that, in addition to the bars 136 which are associated with the main section of said unit, there is provided an auxiliary control section including two groups of similar bars 179, 180, 181 and 182, 183, 184 (see also Figs. 2, 3 and 13) which cooperate with crossed bars 146 to effect various functions designated in Fig. 16 in connection with the control of the type bars during a total-taking cycle and in accordance with the disposition of activated transfer pins 185 (Figs. 3 and 13) along said bars 179 to 184 at points of intersection of the crossed bars 146 therewith. The mechanism shown in Figs. 5 to 10 for operating the bars 179 to 184 to control the various functions will be later described, it being sufficient at this point to briefly set forth the manner in which said functions are initiated through the upper transfer unit.

The bars 179 and 184 are assigned, respectively, to the suppression of the printing of two classes of sub-totals A and B by the type bars allotted for this purpose. By activating pins 185 resting upon bars 186 at the intersection of said bars 179 and 184 with the cross bars 146 individual to said type bars, the operation of either of said bars 179 or 184 at the beginning of a total-taking cycle and before the type bars start upwardly, will result in the operation of those bars 146 located above the activated pins 185 and the consequent release of the associated pawls 148 which then engage the uppermost teeth 150 of their respective type bars to suppress the same to thereby prevent printing of a total, and also avoid clearing of the associated accumulators.

Groups of type bars which are employed to print code designations, also known as group indications, may be suppressed in the same manner as above by activated pins 185 at the intersection of the bars 180 and 183 with bars 146 individual to said type bars. The bar 180 controls a group of type bars assigned to the printing of code designations related to a group or groups of accumulators allotted for the taking of A totals, while the bar 183 controls those type bars that print code designations associated with a group or groups of accumulators assigned to the taking of B totals. The mentioned suppression operation is accomplished after the first listing cycle of the machine during which a code designation is printed, and such suppression continues until a change of designation and consequent total-taking cycle occurs. Then, during the following listing cycle, a code designation of different value will be printed and the above sequence repeated.

Bar 181 is utilized to effect the printing of sub and grand total designations T and G, respectively, in conjunction with the active group or groups of accumulators, by the activation of a pin 185 for each accumulator group at the intersection of said bar 181 with the bar 146 individual to the type bar assigned to said accumulator group for the printing of said designations. The control of said bar 181 is such that it is operated in timed relation to the upward movement of said type bar so that said bar 146 will be actuated to release its pawl to engage the type bar tooth 150 assigned to the particular total designation to be printed.

Type bar elimination in the upper transfer unit is accomplished during both listing and total-taking cycles by rendering active those pins 185 at the intersection of the bar 182 with the bars 146 associated with the type bars that are to be eliminated. Again, as with the bars 179, 184, the bar 182 is operated before the type bars start their upward movement so that the pawls 148 individual to the type bars to be eliminated will be released by the bars 146 to engage the uppermost of the teeth 150 in each of the type bars.

Other control functions besides those enumerated above may be accomplished by the addition of more bars similar to the bars 179 to 184.

*Auxiliary controls by lower transfer unit*

In connection with the lower transfer unit 133, as illustrated in Fig. 17, it is apparent from the foregoing description that when an X hole appears in any column of the card, it will cause the actuation of the bar 137 in said unit which is individual to said column, this being accomplished through the operation of the control pin 112 individual to said column and bar, which pin operates the associated lever 145. At the intersection of said bar 137 with the crossed control bars 156 assigned to the type bars which are to be suppressed by the appearance of said X hole, transfer pins 135 are rendered operative by the set-up plate 187 (Fig. 3) so that when said bar 137 is actuated it will elevate all said operative pins and thus cause the control bars 156 thereabove to be operated to release their respective pawls 157 to engage the teeth 158 and thus prevent said type bars from moving upwardly.

In addition to the group of bars 156 which are each individual to one of the type bars, there are provided other groups of accumulator control bars 188 and 189 (Figs. 1 and 17) similar to the bars 156, and all under the control of X holes in the card columns, said bars 188 and 189 being linked to bars 190. Only two such bars 188 and 189 are shown in Fig. 1 at opposite ends of the large group containing the bars 156 but, actually, there are two groups each containing three of said bars 188, 189. One of these groups 189, as illustrated in Fig. 17, is arranged nearest the analyzing section of the machine while the group 188 is similarly arranged on the opposite side of the large group 156. Said six bars 188, 189 are utilized to differentially control groups of the paired upper and lower sub-total and grand total accumulators 191 and 192, respectively, by causing their adjustment to adding, subtracting or neutral positions. The adding position (Fig. 3) of the accumulators in any one group prevails as long as no X hole appears in a card. To attain the subtracting position of the accumulators in said group or any other group, an X hole can be punched in any one of the columns of the card and said hole will automatically cause the shifting of the accumulators to said position, while an X hole appearing in a different column will automatically produce an adjustment of said accumulators to neutral position. The subtracting and neutral automatic controls are effected by the bars 188, 189 by rendering active, through the set-up plate 187, certain transfer pins at the intersection of said bars 188, 189 with the bars 137 individual to the card columns in which said X holes are located and, in such instance, no operative pins will appear at the intersection of said bars 137 with the bars 156 unless it is desired to suppress the type bars associated with a group of accumulators that is being adjusted to neutral position. In the latter case, active pins at the intersection of bars 156 with the same bar 137 controlled by an X hole and used to effect the neutral adjustment, will produce suppression of the desired type bars, as previously described.

The automatic differential control of a group of accumulators is accomplished, in conjunction with said bars 188, 189, through the medium of two sets of pivoted bails diagrammatically shown in Fig. 17 at 193, 194, 195 and 196, 197, 198. Said bails are structurally illustrated in Fig. 1 as extending across the accumulator section of the machine directly above the front portion of the lower transfer unit 133 and each pair of bails 193—198, 194—197 and 195, 196 is assigned to one group of accumulators. Positioned above the bails 193, 194 and 195 at one end of the transfer unit 133 is a set of three locking interposers 199, 200, 201 each individual to one of the latter bails and provided with a lug 202, represented in Fig. 17 by a dot, which normally rests upon its bail to prevent upward swinging movement thereof. Said interposers are actuated, or not, depending upon the operation or non-operation of their associated bars 188 and the condition of these bars is, in turn, dependent on the active or inoperative positions of transfer pins 203 which, like the pins 135, are under the control of the set-up plate 187 and are the pins previously mentioned which are located at the intersection of the bars 188 with the bars 137. Similarly, above the other end of the transfer unit 133, there are three locking interposers 204, 205 and 206 provided with lugs 207 individual, respectively, to the bails 196, 197 and 198 and actuated, in the same manner as the first named interposers, by the bars 189 under the control of active transfer pins 208 which are the other previously mentioned pins at the intersection of said bars 189 with the bars 137. The pair of interposers 201, 206 automatically controls the pair of bails 193, 198; the intermediate pair of interposers 200, 205 likewise controls the bails 194, 197; and the interposers 199, 204 similarly control the bails 195, 196. These controls determine, by the relative positions of the interposers of each pair, whether the group of accumulators assigned to each pair of bails is to perform an adding or subtracting operation or is to be adjusted to neutral position.

In addition to the six columns of transfer pins 203, 208 which automatically and variably control the positions of the two sets of interposers, the unit 133 has the six rows of transfer pins 209 (Fig. 3) arranged in two groups extending longitudinally of the bails 193 to 198, with each row being associated with one of said bails and having therein a pin for each set of accumulators 191, 192, and said pins 209 are also rendered operative or remain in their normally inoperative positions under the control of the set-up plate 187. The six rows of pins 209 thus provide a column of six pins for each set of accumulators, and wherever the sets of accumulators of any group thereof are to be differentially controlled, two pins in each column assigned to each set of such accumulators in said group are rendered operative by the plate 187, while the remaining pins in said column are left inactive. Thus, with the bails 193, 198 assigned to one group of accumulators for the automatic and differential control thereof, the two pins 209 in each column associated with the sets of accumulators in said group and located below said bails, will be made operative by the plate 187.

As long as no X hole appears in a card to operate either of the locking interposers 201 and 206 individual to the respective bails 193, 198, said interposers will engage their bails by means of the lugs 202 and 207, respectively, to prevent upward swinging movement of either bail under the influence of a vertically movable feeler and accumulator control member 210 (Fig. 3) associated with each set of upper and lower accumulators. Each member 210 is rockingly supported so as to assume three positions for differentially controlling its set of accumulators. When in its vertical position, said member will adjust the accumulators to their adding position; when rocked clockwise, it will adjust the accumulators to subtracting position; and when tilted in the opposite direction, it will cause said accumulators to assume their neutral position. Therefore, with the above mentioned condition existing in which no X hole appears and wherein neither interposer 201 or 206 is operated to unlocking position by its associated bar 188 or 189, when the feeler 210 rises during each machine cycle to contact the two active pins 209, the latter will combine with the locked bails 193, 198, to form a rigid abutment and said member 210 thereby will be caused to assume its vertical or adding position. If, however, the interposer 201 (Fig. 1) is operated by an active pin 203 beneath the bar 188 associated with said interposer, the latter will be moved forwardly to its unlocking position with respect to the bail 193 to release the latter for upward movement and, with the interposer 206 over the bail 198 remaining in its locking position because of the absence of an active pin 208 under the bar 189 which controls said interposer 206, it will be apparent that as the feeler 210 contacts the two active pins 209 assigned to each set of accumulators in the group under discussion, the pin under the bail 193 will be raised to swing said bail upwardly, while the other pin 209 will be held stationary by the locked bail 198. Consequently, the feeler 210 will be turned clockwise to shift the associated set of accumulators to subtracting position. As will now be obvious, the third or neutral position of each set of accumulators is attained by reversing the above described positioning operation of the two interposers 201 and 206 to retain the bail 193 locked and to release the bail 198 for upward movement.

In like manner, the sets of accumulators included in the other two groups may be automatically and differentially controlled by rendering active two pins 209 in each of the columns assigned to said accumulators, with said pins for one group of accumulators positioned under the pair of bails 194, 197, and those for the other group located beneath the pair of bails 195, 196, and with said pairs of bails being controlled, respectively, by the pairs of interposers 200, 205 and 199, 204.

It will be noted that the bails 194 and 195, at their left ends (Fig. 1) are provided with longitudinally offset notches 202a, and that the bails 197 and 198, at their right ends, have similar notches 207a. When the interposer 201 is advanced to unlocking position with respect to the bail 193 during the control of one group of accumulators, as hereinbefore described, the lug 202 on said interposer will be vertically aligned with the notch 202a in the bail 194. This alignment frees the bail 194 for upward movement in the control of a second group of accumulators simultaneously with the first named group in the event that the interposer 200 is advanced to disengage its lug 202 from said bail 194. In the latter event, the lug 202 on the interposer 200 will be vertically aligned with the notch 202a in the bail 195 so that the latter will also be free for upward movement should the interposer 199 be advanced to disengage its lug 202 from said bail 195 in the control of a third group of accumulators simultaneously with either or both of the first two mentioned groups. Similarly, at the right end of the bails, advancement of the interposer 204 will vertically align its lug 207 with the notch 207a in the bail 197 to free the latter for upward movement should its controlling interposer 205 be advanced, and advancement of the latter interposer will align its lug 207 with the notch 207a in the bail 198 in order to permit upward movement of the latter bail should its interposer 206 be advanced.

*Operation of auxiliary control section of upper transfer unit*

Referring particularly to Figs. 5 to 10 and 13, the operation of the previously mentioned bars 179 to 184, the left ends of which extend through a slot 279 in the wall 37, has its origin on the vertical cam shaft 162 on which are mounted three cams 280, 281 and 282 for rocking the follower levers 283, 284 and 285, respectively, during each cycle of operation. As will presently appear in detail, the cam 280 and its lever 283 control the previously described suppression of printing of A and B totals through the bars 179 and 184, the A and B group indications through the bars 180 and 183, and the type bar elimination through the bar 182, and the angularly displaced cams 281 and 282 and their levers 284 and 285 control at different intervals, respectively, the printing of G and T designations through the bar 181.

Figure 9:
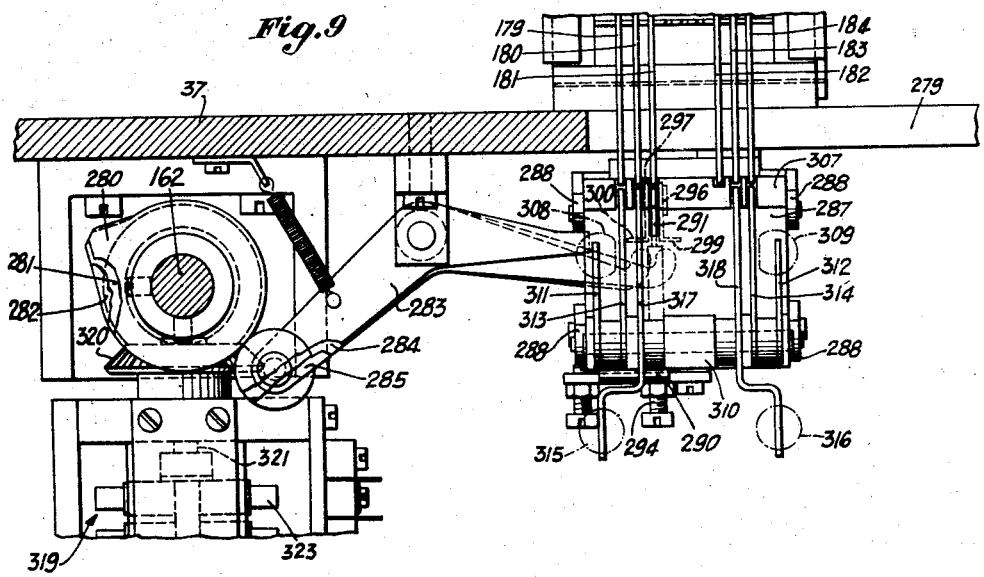
Fig. 9 is an enlarged section on the line 11—11 of Fig. 5 illustrating the control mechanism for the auxiliary section of the upper transfer unit.
Figure 10:
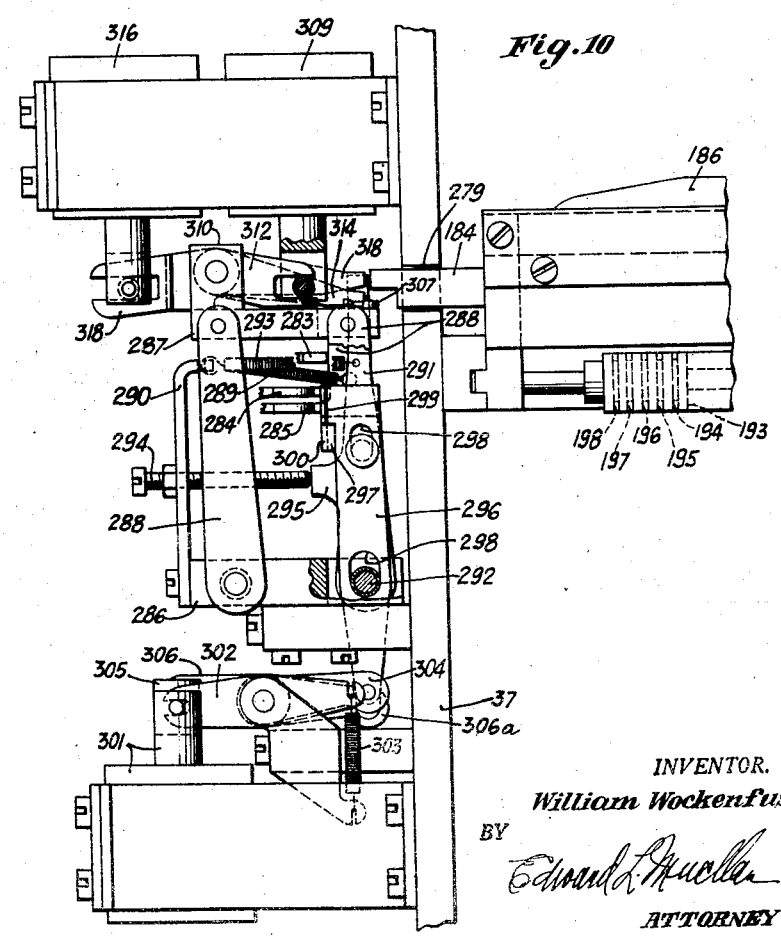
Fig. 10 is an elevation, partly in section, of the mechanism shown in Fig. 9, with parts in their operated positions.

The operating mechanism responsive to the various mentioned cams for actuating the bars 179 to 184 comprises a framework consisting of a stationary base plate 286 attached to the wall 37 and an upper supporter plate 287 connected, by four links 288, to the plate 286 for slight reciprocatory movement toward and away from said bars. This motion occurs during every cycle of the machine while the cam shaft 162 is being driven and is accomplished by engagement of one end of the lever 283 with one of the links 288, as best shown in Figs. 9 and 10. A spring 289 connects a bracket 290 secured to the plate 286 with one of the links 288 to effect the return motion of the framework after it has been momentarily advanced by the cam 280 and lever 283 toward said bars 179 to 184.

An operating arm 291 for the bar 181, which is the bar that controls the printing of the T and G designations, has its lower end pivoted at 292 to the base plate 286 and its upper end disposed in alignment with said bar 181 so as to actuate the latter when said arm is advanced, either under the influence of the cam 281 and its lever 284 when a G designation is to be printed, or by the cam 282 and its lever 285 when a T designation is to be printed by the type bar or bars controlled by the bar 181 in the manner previously explained. A spring 293 connecting the bracket 290 with the arm 291 restores the latter after it has been advanced, and this restoring movement is limited by a set screw 294 threaded in the bracket 290 and engaging the projection 295 on said arm 291.

The dual control of the bar 181 for T and G printing during total-taking cycles is effected by two independently and vertically movable interposers 296 and 297 (Fig. 13) arranged on opposite sides of the arm 291 and having slotted connections 298 therewith so as to guide the interposers in their vertical movements. The upper end of the interposer 296 has a lateral extension 299 normally disposed slightly above and projecting in an opposite direction from a similar extension 300 on the interposer 297. In the lower normal position of the interposer 296 (Figs. 2 and 5), its extension 299 is not in the path of movement of the adjacent end of the lever 284 which will then pass over said extension upon advancement of the framework, but when said interposer is raised, as shown in Fig. 10, the lever 284, when operated, will contact the extension and, through the connection of the interposer with the arm 291, the latter will be advanced with said framework and thus operate the bar 181 to cause the arresting of a type bar at the proper position for printing a G designation. Similarly, but at a different time in the machine cycle, when the interposer 297 is raised, its extension 300 will be projected into the path of the adjacent extremity of the lever 285, resulting in the same operation of the arm 291 and bar 181 to cause the printing of a T designation. The high points of the two cams 281 and 282 which control the operations of the bar 291 are angularly displaced so that said arm is operated at different instants in the cycle to thus arrest the type bar in different positions for the printing of the T and G designations.

For raising the interposer 296 to operative position at the beginning of the grand total-taking cycle which is initiated by depressing a grand total key (not shown), there is provided a G-print solenoid 301 (Figs. 5 and 10) whose core is connected to one end of a lever 302, to the other end of which is attached a restoring spring 303. An arm 304 mounted on the pivot of said lever and movable therewith, is connected to the lower end of the interposer 296 so as to raise the latter upon energization of said solenoid. A T-print solenoid 305 automatically energized at the beginning of a total-taking cycle, is similarly connected, through the lever 306 and arm 306a, to the lower end of the interposer 297 to raise the same, and said interposers 296, 297 are lowered, upon de-energization of their respective solenoids by the springs 303 connected to the levers 302 and 306.

The bar 182 utilized for type bar elimination is operated upon each advance of the framework under the control of the lever 283, and this is accomplished through direct contact of a crosspiece 307, mounted on the movable plate 287 of the framework, with the adjacent end of said bar (see Fig. 9).

Control of the A and B total print-suppression operations through the respective bars 179 and 184 is attained, respectively, by the print suppress solenoids 308 and 309 which are supported above the operating mechanism for said bars and are energized at the beginning of a total-taking cycle. A bearing 310 on the movable plate 287 pivotally supports bifurcated arms 311 and 312 coupled, respectively, to the cores of solenoids 308 and 309. Interposers 313 and 314, also pivotally supported by the bearing 310, are joined thereon to their respective arms 311 and 312, and the free forward ends of said interposers are so disposed with respect to their bars 179 and 184 that when the solenoids are not energized and the framework is advanced by the arm 283, the interposers will pass beneath the reduced end of said bars and not operate the same. However, when said solenoids are energized, the interposers will be raised and thus align themselves with the extremities of their respective bars 179, 184 so that upon advancement of the framework, said bars will also be advanced to operate the activated pins 185 at the intersection of said bars with the cross bars 146 assigned to those type bars which are to be suppressed by the pawls 148 to prevent printing of totals by said type bars.

Solenoids 315 and 316, arranged on the opposite side of the bearing 310 from the solenoids 308, 309 are energized in the initial stage of the cycle following a total-taking operation and are utilized to control the operation of bars 180 and 183, respectively, assigned to A and B group indications, whereby type bars employed for printing code designations may be suppressed at all times except during the first printing of a code designation which occurs after each total-taking operation has been completed. The core of solenoid 315 is directly connected to the rear end of an interposer 317 associated with the bar 180 and pivoted in bearing 310, and the solenoid 316 is similarly connected to the pivoted interposer 318 which controls the bar 183. Said interposers have their forward ends normally aligned with the adjacent extremities of their respective bars 180, 183 and will thus operate the latter upon each advancement of the framework as long as the solenoids 315 and 316 are not energized. Upon energization of said solenoids, which occurs after each total-taking cycle as previously mentioned, the forward ends of the interposers 317 and 318 are lowered so that when the framework is advanced, said ends will pass beneath the extremities of the bars 180, 183 and thus fail to operate the same, with the result that the activated pins 185 between said bars and the cross bars 146 assigned to the group indication type bars will not be operated to suppress the latter bars which will then rise to print the proper code designation.

The timing shaft 162, in addition to controlling the operations just described, also operates the print-control switching unit generally indicated at 319 (Fig. 5), through gearing 320 which drives the cam shaft 321 of said unit. On said shaft 321 are a plurality of cams generally indicated at 322 and designed to operate micro-switches generally indicated at 323 for controlling, at predetermined intervals, the closing and opening of various circuit connections associated with certain printing operations of the machine, as fully explained in the aforementioned co-pending application.

*Type bar operation*

The upper sections of the type bars 141 (Fig. 3) are removably joined, at 324, to the lower sections 325 thereof which, in their lowered positions, rest upon and depress the spring urged plungers 326 mounted in a stationary member 327 so that said plungers will impart an initial impetus to the type bars at the beginning of their upward movement toward printing positions. The lower end of the section 325 of each type bar is engaged by one end of an operating arm 328, the other end of which is pivoted at 329. The type bars are urged upwardly by the springs 330 and are controlled in such upward movement by the common bail 331 which oscillates about the same axis as the arms 328 and engages them to control their upward movement under the influence of said springs until the type bars are arrested, whereupon the bail moves upwardly independently of the arms. Said bail is operated in synchronism with the action of the previously described scanning device 211 so that the type bars will be arrested in proper positions by the action of the upper transfer unit 132 which is under the control of the analyzer and which, in turn, controls the arresting pawls 148. The subsequent downward movement of the bail 331, following the printing operation later to be described, engages the same with the arms 328 of all operated type bars to restore the latter to their lower positions at the conclusion of a machine cycle.

Figure 11:
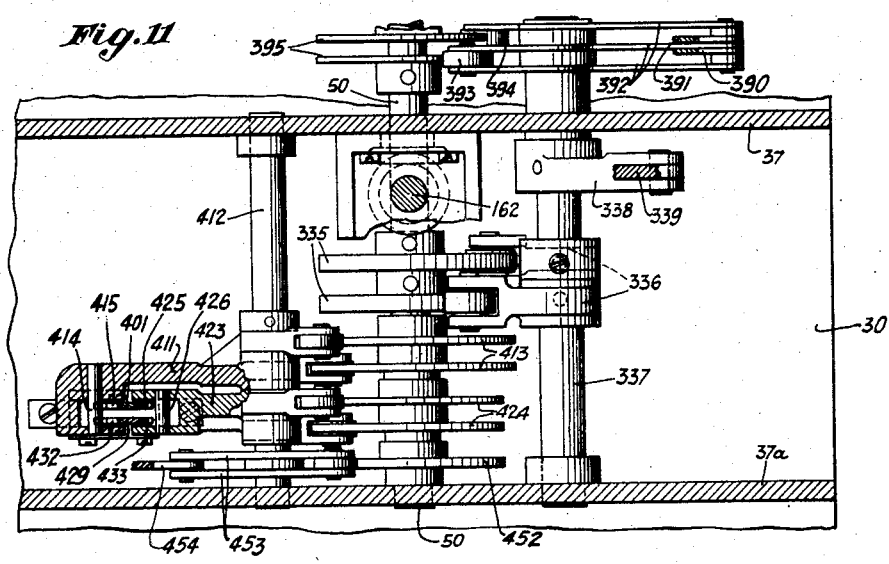
Fig. 11 is a horizontal section on the line 13—13 of Fig. 5.

To oscillate the bail 331, the ends of its supporting frame are connected by links 332 to crank arms 333 secured on the rock shaft 334. Said shaft is operated from the main cam shaft 50 (Figs. 2, 5 and 11) by the complementary cams 335 thereon, which are engaged by the two rollers of a follower 336 secured on the rocking stub shaft 337. An arm 338 on the latter shaft is connected, by a link 339, to a similar arm 340 on one end of the shaft 334 so that oscillatory motion is transmitted thereto from said cams 335 to raise and lower the bail 331.

Figure 12:
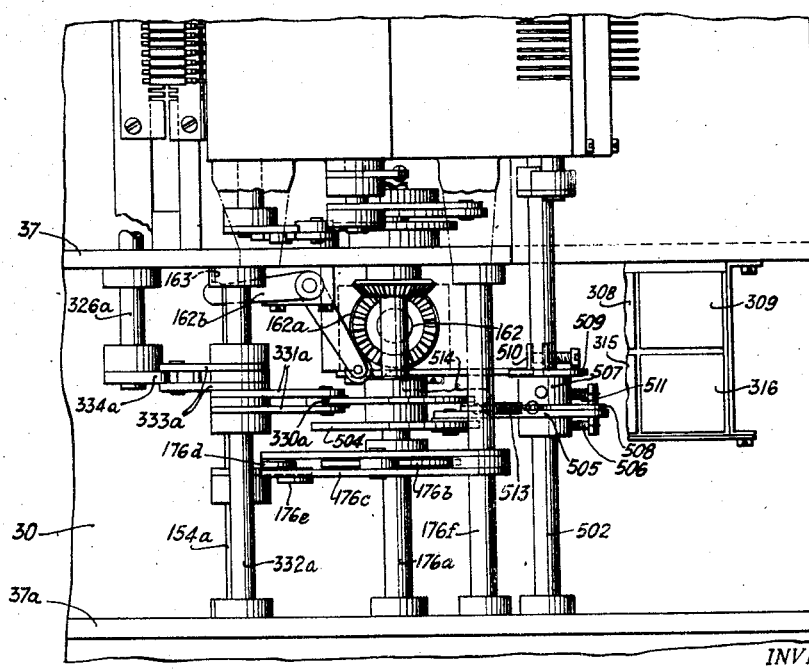
Fig. 12 is a plan view of the left portion of Fig. 4.

After the type bars have been arrested in their raised position but before the printing operation is performed, it is desired to accurately align the type with elements of the printing mechanism. For this purpose there is provided an aligning bail 325a (Fig. 3) mounted on a rock shaft 326a and supporting a pivotal pawl 327a for each type bar by means of the crank arm 328a and the rod 329a which forms the pivot for said pawls. A cam 330a (Figs. 4, 5 and 12) on the shaft 176a controls the bail 325a and, for this purpose, is connected by follower 331a secured on the rock shaft 332a. One end of the latter shaft carries an arm 333a engageable in the bifurcated end of an arm 334a on the adjacent end of the shaft 326a so as to rock the same to move the bail toward and away from the type bars. In operation, the bail is moved inwardly by said cam as soon as all type bars have reached their printing position and, in so doing, the pawls 327a are engaged with the slopes of the teeth 335a of said bars and, due to the slight inclination of the pawls, will thereby engage the teeth and lower said bars slightly to thus position their type properly for the printing operation that immediately follows. At the conclusion of said operation, the type bar restoring bail 331 starts its downward movement and, at substantially the same time, the bails 154 and 160 (Fig. 1) disengage the arresting pawls 148 and 157 from said bars. Therefore, in order to prevent said bars from movement upwardly under the influence of their springs 330 before the bail 331 engages the bars to move them downwardly, the pawls 327a remain in their operative position in engagement with the teeth 335a until the type bars have been fully restored, whereupon the said cam 330a acts to rock the bail 325a and its pawls to normal or inoperative position.

Accumulator position control unit

Figure 3:
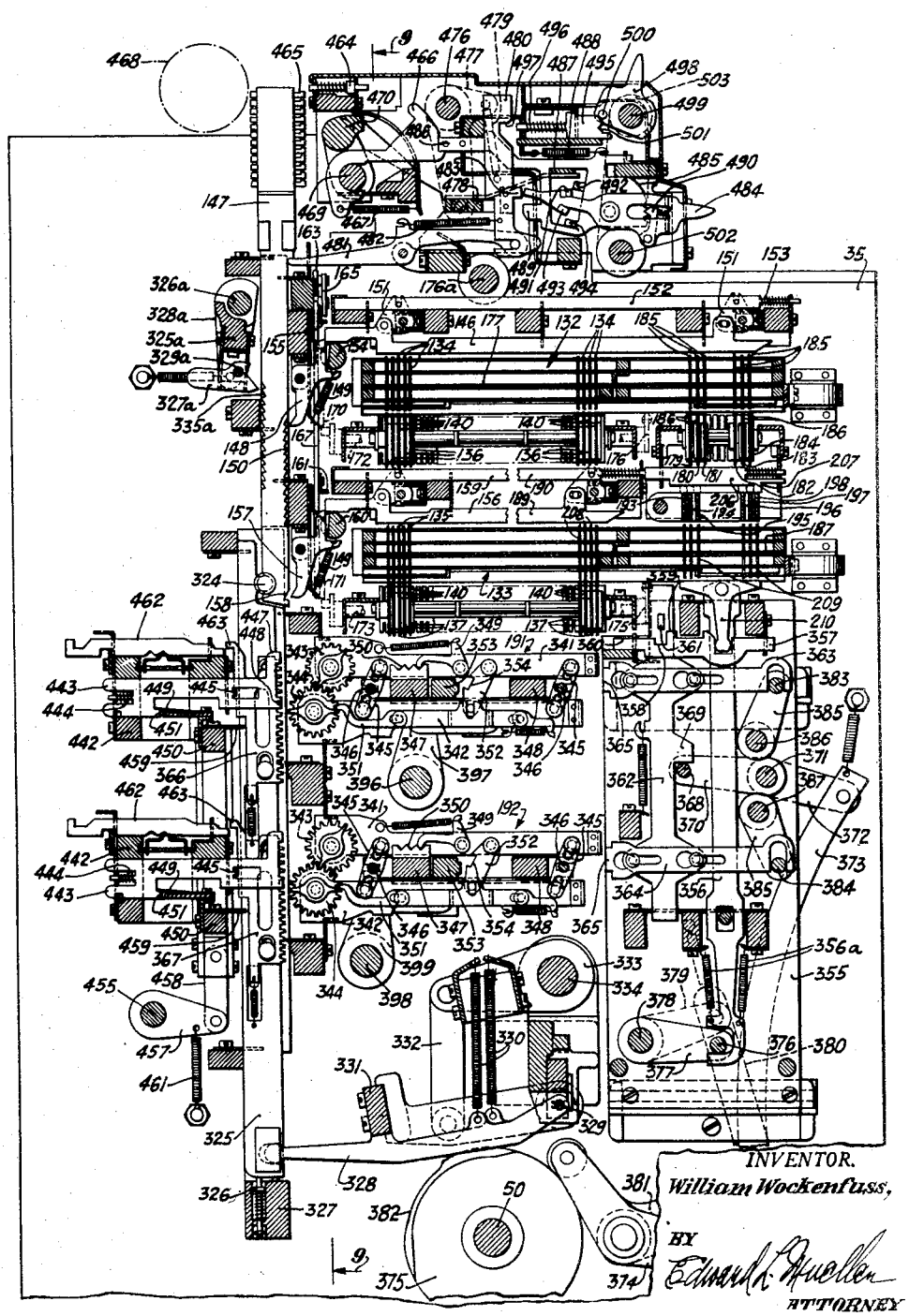
Fig. 3 is a transverse section through the printing section on the line 8—8 of Fig. 2.
Figure 4:
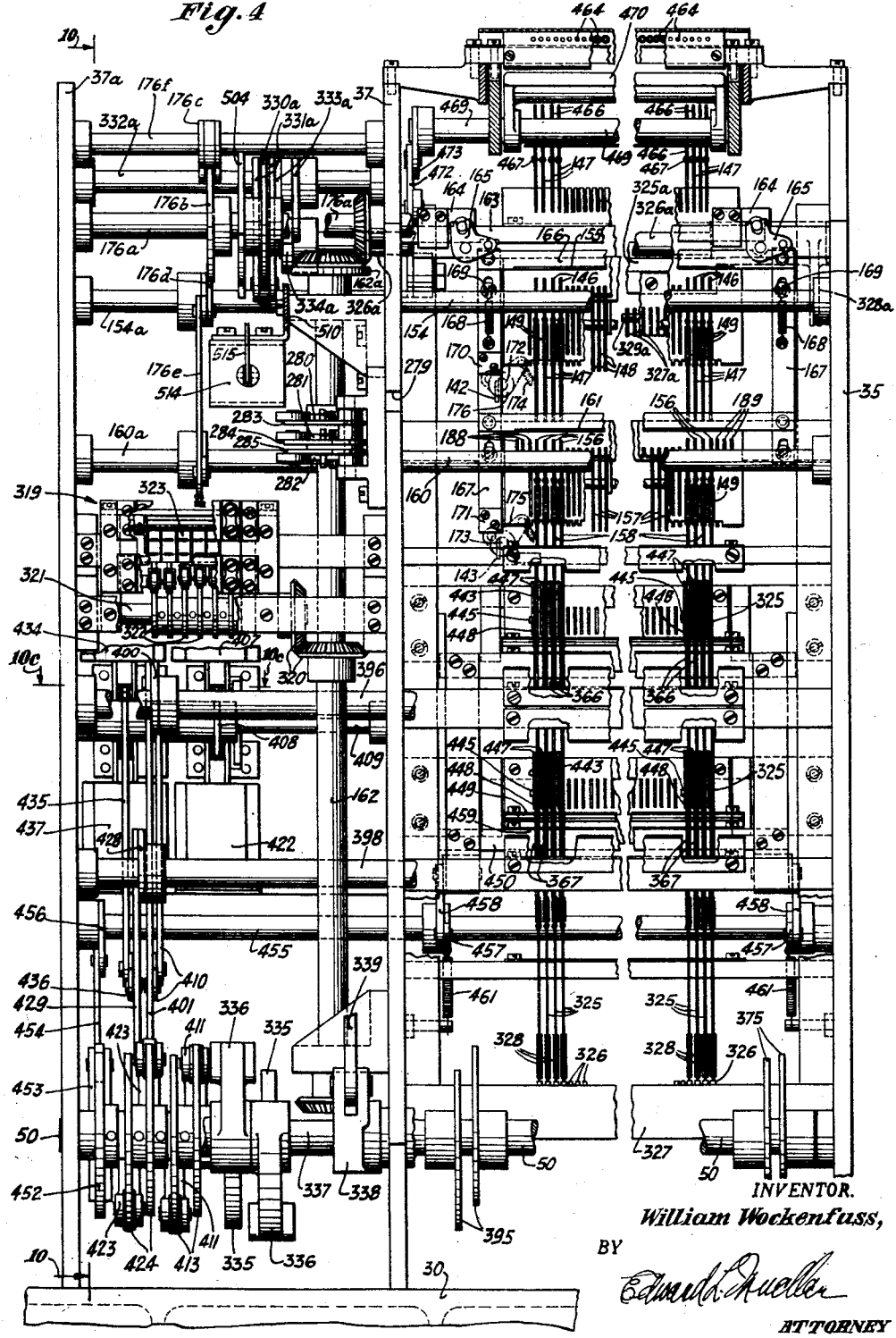
Fig. 4 is a section on the line 9—9 of Fig. 3.

This unit, which is best illustrated in Fig. 3, is designed to control the adding, subtracting and neutral positions of the accumulators 191, 192 in accordance with the settings of the transfer pins 209 of the auxiliary section of the lower transfer unit 133 and their effect upon the feeler members 210 which form part of the control unit. The latter comprises a frame 355 removably mounted between the walls 35, 37 of the machine and situated beneath said auxiliary section of the unit 133 so as to locate the feelers 210 in operative association with the pins 209 to be thereby controlled during each cycle of operation. For each feeler 210, which is individual to a set of upper and lower accumulators and is pivoted on a vertically movable bar 356 urged upwardly by springs 356a, there is provided a sliding interposer 357 engaged by the lower end of its feeler so as to be adjusted horizontally thereby to either one of three positions depending upon the position assumed by said feeler when it engages said pins 209. Said three positions of the interposer correspond to the adding, subtracting and the neutral positions of its set of accumulators and are identified on the upper edge of the interposer by shoulders 358, 359 and 360, respectively, all in different planes or at different heights and each adapted, in accordance with the position to which the interposer has been adjusted by its feeler, to vertically align itself with a stop lug 361 on the vertically movable control bar 362. In the raised position of said bar 362, its lug 361 is elevated slightly above the highest shoulder 359 so that it will not interfere with the free sliding adjustment of the interposer 357. Said bar 362 carries the upper and lower accumulator positioning slides 363 and 364 associated, respectively, with the accumulators 191 and 192, and controls the horizontal location of said slides relative to said accumulators by the extent of the variable downward movement of the bar which is, in turn, controlled by engagement of the lug 361 with one of the shoulders of the interposers 357. Thus, if said lug is aligned with the shoulder 359, then when the bar 362 has been lowered a slight distance, the lug will engage said shoulder to arrest the downward movement of the bar. When so arrested, the inner reduced extremity 365 of each slide 363, 364 will be aligned with the upper plates 341 of the accumulators so that when the slides are moved inwardly they will contact the adjacent ends of said plates 341 to cause reverse movements of the accumulator plates which movements, in the instance being described, will position the wheels 343 for operative engagement with the upper and lower accumulator racks 366 and 367 carried by the lower section 325 of the associated type bar when the accumulators are advanced toward said bar in timed relation to the downward or upward movement thereof, depending upon whether an accumulating or totalizing operation is to be performed. The adding position of the accumulators, shown in Fig. 3, is similarly controlled by shifting the interposer 357 to align its lowermost shoulder 358 with the lug 361 so that downward movement of the bar 362 will be arrested in the position in which the ends 365 of the slides 363, 364 will be aligned with the lower accumulator plates 342 to thus advance the wheels 344 and retract the wheels 343 when said slides are operated. The third or neutral position of the accumulators is attained by aligning the shoulder 360 of the interposer 357 with the lug 361 so that the bar 362 will be arrested in its intermediate position wherein the ends 365 of the slides 363, 364 will be disposed in alignment with the space between the accumulator plates so that as the slides are operated, said plates will be engaged by the shoulders formed by said ends 365 and thus be shifted to a position which will adjust both wheels 343, 344 to neutral.

The control bars 362 associated with the various accumulators are raised to their elevated positions before the conclusion of a cycle of operation and, at the beginning of a succeeding cycle and before the type bars start their upward movement, the bars 356 are raised to cause their feelers 210 to sense the condition established by their respective pins 209 and associated bails 193 to 198 to thereby adjust the various interposers 357 to proper position before the bars 362 start downwardly. When all said bars 362 have been arrested in their downward movements by the interposers, the slides 363, 364 are operated to adjust the accumulators to the desired position and are then immediately retracted, and before the conclusion of said succeeding cycle of operation the bars 362 are again elevated.

The bars 362 are under the control of a common bail 368 which engages an extension 369 on said bars, and which is carried by the arms 370 secured to the rocker shaft 371. Said shaft also carries a crank 372 connected to the upper ends of links 373, the lower ends of which are joined to a follower bell crank 374 engageable with the cam 375 secured on the main cam shaft 50 and operable to actuate said bail 368 in the timed relation above mentioned.

The bars 356 are restored by a common bail 376 engageable with the lower ends of said bars and carried by arms 377 mounted on the rock shaft 378. A crank 379 on said rock shaft is connected to the upper end of a link 380 the lower end of which is joined to a bell crank 381 having a follower engageable with the cam 382 mounted on the shaft 50 alongside the cam 375. Said cam 382 moves the bail 376 upwardly at the beginning of a cycle to permit the bars 356 to be moved upwardly by their springs 356a so as to allow the feelers 210 to engage with the pins 209 and thereby effect adjustment of the interposers 357, after which said bars 356 are restored by said bail 376.

The slides 363 and 364 are controlled, respectively, by the common bails 383 and 384 connected by arms 385 to the rock shafts 386 and 387. Cranks 388 and 389 secured to the shafts 386 and 387 (Fig. 2) are connected to the upper ends of links 390 and 391 the lower ends of which are pivoted to a bell crank 392 having followers 393 and 394 which engage complementary cams 395 also mounted on the shaft 50. Said cams operate the bell crank 392 to simultaneously rock the shafts 386 and 387 in opposite directions so as to cause the bails 383, 384 to advance the slides 363, 364 to perform their respective functions, as previously described, and to then retract said slides preparatory to their next operation.

Accumulator operating mechanisms

The upper and lower accumulator frames including the portions 347, 348 are reciprocated in timed relation to the rise and fall of the type bars to engage either the wheels 343 or 344, depending upon whether there is to be a subtracting or adding operation, with the accumulator racks 366 and 367 mounted on said bars. When adding or accumulating, said frames are advanced towards said type bars just before the latter start their downward movement, and during a total-taking cycle the frames are advanced prior to the rise of said type bars.

The upper frame in which the sub-total accumulators 191 are supported, is reciprocated by a rock shaft 396 connected, by arms 397 (Fig. 2), to the ends of said frame, while the lower frame for the grand total accumulators 192 is operated by a rock shaft 398 connected, by arms 399, to the latter frame, and both of said shafts are differentially controlled with relation to their time of operation so that their respective frames may be advanced, as above mentioned.

Figure 5:
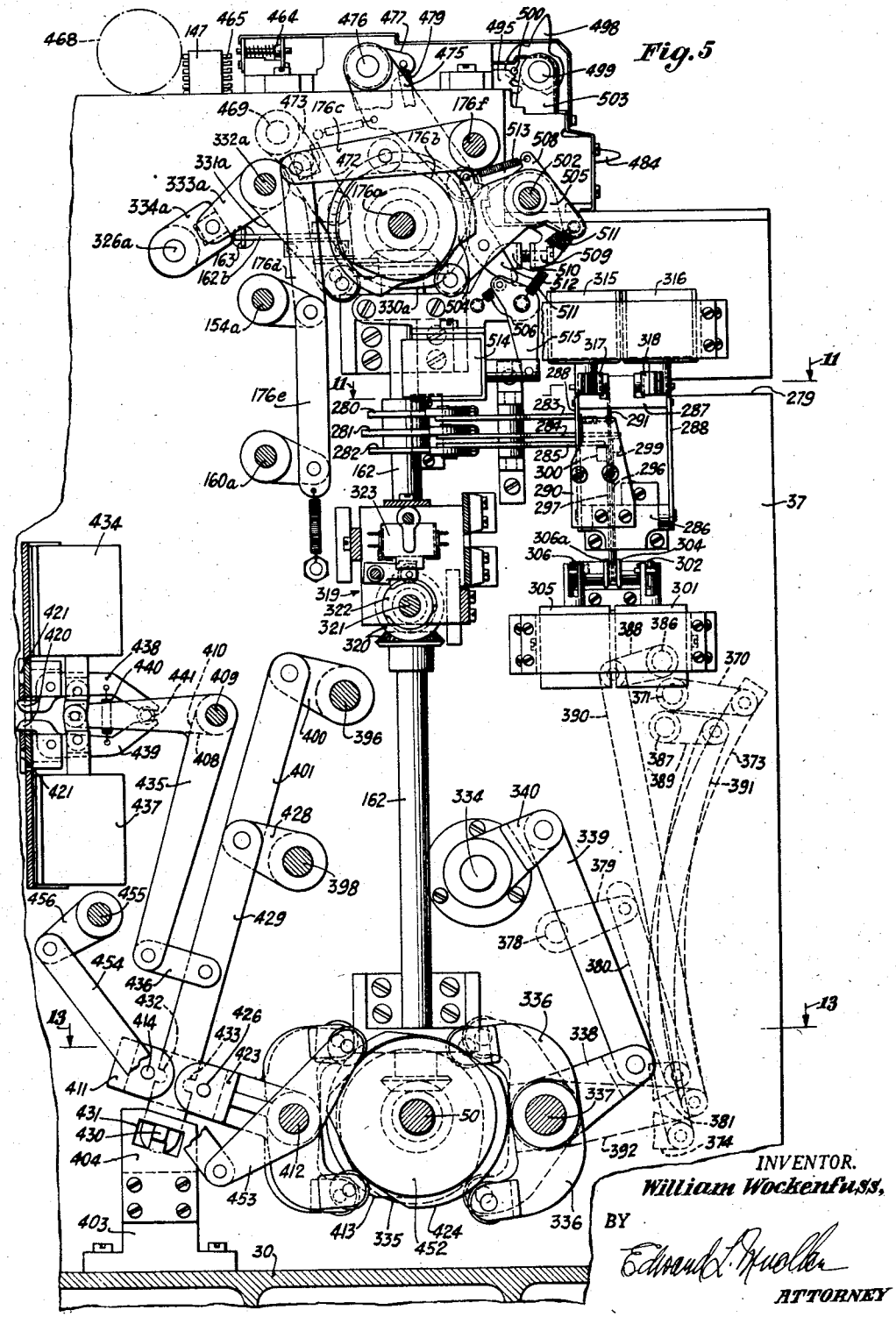
Fig. 5 is a section on the line 10—10 of Fig. 4.

With respect to the sub-total accumulators and as shown in Figs. 5 and 6, the shaft 396 is connected, by the crank arm 400, to the upper end of a link 401 the lower end of which is movable relative to a vertically disposed lock plate 402 secured on the block 403 attached to the base 30 of the machine, said plate 402 being spaced from a similar plate 404 also secured on the block 403 and associated with the operating mechanism of the accumulators 192 presently to be described. Said plate 402 is provided with an inverted U-slot 405 in which is movable a lug 406 carried by the lower end of the link 401 which is adapted to assume a central or neutral position (similar to Fig. 5), a second position to the left, as shown in Fig. 6, when an adding or substracting operation is to be performed, and a third position to the right during a totaling cycle, and at the conclusion of each cycle the link is restored to its neutral position. To effect the adjustment of said link to its second position during an adding cycle, there is provided an add solenoid 407 which, when energized, swings the bell crank 408 to the position of Fig. 6 and, in so doing, rocks the shaft 409 to which said bell crank is attached. Thereupon, the links 410 connecting said bell crank with the link 401 swings the latter to the left. The energization of the solenoid 407 occurs at the moment that an oscillatory bail 411 mounted on the shaft 412 reaches its uppermost position under the control of the complementary cams 413 (Figs. 4 and 11), whereupon the bail and the link 401 are coupled together by engagement of a pin 414 on the bail in a notch 415 in the edge of the link. Under the influence of the cams 413, the bail 411 and the link 401 then move downwardly, with the lug 406 on the link entering the left hand branch of the slot 405 to thus prevent a return movement of the link 401 toward its neutral position so that the link and bail will remain coupled. The downward movement of said link rocks the shaft 396 counterclockwise to thereby advance the upper accumulator frame toward the type bars the instant before they start their restoring movement. Under the influence of the cams 413, the bail 411 dwells in its lower position while accumulation proceeds, and at the conclusion thereof and after the solenoid 407 has been de-energized, the bail again rises and, through its coupling to the link 401, rotates the shaft 396 clockwise to retract the accumulator frame. When the bell crank 408 is operated by the energization of the solenoid 407, as described, a pin 416 on said bell crank raises a restoring lever 417 against the tension of spring 418 connecting said lever with a similar lever 419 so that upon restoration of the link 401 to its raised position by the bail 411 and consequent disengagement of the lug 406 from the left branch of the slot 405, the spring 418 will become effective, through the lever 417 and the pin 416, to swing the bell crank 408 downwardly and thus operate the link 410 to return the link 401 to neutral position. The pivotal movement of the lever 417, and consequently of the link 401 to neutral position, is limited by engagement of the end 420 of said lever with a stop 421.

When a change of designation takes place to initiate a total-taking cycle, the sub-total solenoid 422 (Fig. 6), located directly below the solenoid 407, is energized before the type bars start their upward movement. The solenoid 422 operates to pull the bell crank 408 downwardly to reverse the previously described shifting of the link 401 so that its lug 406 will be moved from its neutral position into alignment with the right hand branch of the slot 405. This occurs when the bail 423 mounted on shaft 412 is in its uppermost position under the control of the complementary cams 424 on the shaft 50. As a result of the shifting of the link 401, its notch 425 will receive the pin 426 on said bail 423 to thus couple the latter to said link, and upon downward movement of the bail, with the lug 406 entering the right hand branch of the slot 405, the shaft 396 will be turned counterclockwise to advance the upper accumulator frame as previously described but prior to the upward movement of the type bars. Lowering of the bell crank 408 causes its pin 416 to also rock the lever 419 downwardly against the tension of the spring 418 so that the latter will become effective to restore the link 401 to its neutral position when the bail 423 swings upwardly under the influence of the cams 424, the solenoid 422 having previously become de-energized.

Referring now to Figs. 5 and 7, the control of the rock shaft 398 which advances and retracts the lower accumulator frame whose accumulators are utilized for grand total operations, will now be described. Said shaft 398 being connected by arms 399 to the lower accumulator frame, is also connected, by the crank arm 428, to the upper end of the link 429 similar to but shorter than the link 401 and having a lug 430 movable in the slot 431 formed in the lock plate 404. The link 429 is provided in its edges with the opposed notches 432 and 433 adapted, respectively, to receive pins 414 and 426 of the two bails 411 and 423 when said link is shifted from its neutral position to the left during a grand total adding operation or the right (Fig. 7) during a totalizing operation. When it is desired to accumulate in the grand total accumulators 192, the grand total add solenoid 434 is energized during the adding cycle and with the bail 411 in its uppermost position. Operation of said solenoid swings the bell crank 435 clockwise about the shaft 409 and, through the connection 436, the link 429 is swung to the left so as to couple the same with the bail 411 which thereupon moves downwardly with said link to rock the shaft 398 and thus advance the lower accumulator frame. During this operation the lock plate 404 performs the same function as the plate 402 in preventing restoration of the link 429 to neutral position before the bail 411 is again raised. The adjustment of the link 429 to its right hand position, as shown in Fig. 7, preparatory to a grand totalizing operation, is accomplished through the energization of the total solenoid 437 which occurs before the type bars start upwardly and which reverses the previously described operation of the bell crank 435 to shift the link 429 to its right hand position where it will be coupled to the bail 423 so that, under the control of the cams 424, the lower accumulator frame will be advanced to accomplish the rolling out of the totals from the accumulators 192. Levers 438 and 439, similar to levers 417 and 419 and connected by the spring 440, are operatively associated with a pin 441 on the bell crank 435 so as to effect restoration of the link 429 to neutral from either of its shifted positions when the solenoids 434 and 437 are de-energized and the bails 411 and 423 have been raised.

Carry over units

Each of these units, as shown in Fig. 3, comprises a stationary frame 442 mounted on the back of the machine in proximity to and across its associated bank of accumulators. In said frame are mounted the carry over slides 443 yieldably urged inwardly by the springs 444 and each having its inner end disposed between the accumulator rack 366 or 367 of one type bar and the adjacent type bar of the next higher order so as to be controlled by its associated accumulator and, in turn, control the accumulator rack of the latter bar. This control involves either the arresting of said higher order rack in its zero position just prior to the time its type bar reaches the extent of its downward movement, as when no carry over is to be effected, or the continued movement of said rack with its type bar in which event said rack will carry one into the accumulator wheel of the higher order. Said control is accomplished by a laterally extending stop lug 445 struck from the slide 443 and either disposed in the path of the shoulder 446 on the higher order accumulator rack to arrest the same at zero position, or which is removed from said path upon operation of the slide 443 when a carry over operation is to be accomplished. Said slide 443 is operated either by a high tooth on the subtracting wheel 343 engaging the projection 447 at the inner end of the slide or by a high tooth on the adding wheel 344 contacting the projection 448 of said slide. In either event the slide is forced outwardly against the tension of its spring 444 and when this occurs a normally tensioned leaf spring 449 carried on a vertically movable frame 450 engages the extremity of the projection 451 on said slide to retain the same in its operative position. When the slide is thus adjusted, its lug 445 will be out of the path of the shoulder 446 of the descending accumulator rack carried by the type bar of the next higher order and said rack will therefore travel with said bar to the extent of downward movement of the latter and thus accomplish the carry over into the accumulator wheel engaged with said rack, whereupon the accumulator is retracted as previously described. Before the type bar again starts its upward movement in the next cycle of operation, a cam 452 (Figs. 4, 5 and 11) on the shaft 50 operates a follower 453 mounted on the shaft 412 and connected to a link 454 which is joined to the rock shaft 455 by a crank 456. Said shaft 455 is connected by the cranks 457 to links 458 pivoted to the lower end of the vertically movable frame 450 and through the foregoing connections said cam elevates the frame. When this occurs, a common restoring plate 459 for each of the carry over units and mounted on said frame 450, moves upwardly to engage the shoulders 460 of any of the accumulator racks 366 or 367 which have been moved downwardly to carry over position. Said engagement raises said racks to their zero positions shown in Fig. 3. At the same time, the springs 449 of the operated slides 443 are carried upwardly with the frame 450 and are thus disengaged from the extremities of the projections 451, allowing the springs 444 to restore said slides inwardly so that their lugs 445 will again be positioned beneath the shoulders 446 of the racks to thus retain them in zero position in which they must be in the event that a total-taking cycle is initiated and the accumulator wheels are thrown into mesh with their racks before the type bars start upwardly. As soon as the slides 443 have been restored, the cam 452 permits the frame 450 to move downwardly under the influence of the springs 461 connected to the cranks 457.

Accumulator split

Means are provided for splitting the accumulators and thereby disabling the carry over mechanisms at any desired point or points. For this purpose, the carry over unit has mounted on its frame 442 an interposer 462 for each accumulator rack. Each interposer is slidable from a normally inoperative position shown in Fig. 3 to an inward operative position wherein it is frictionally held with its inner end disposed in the path of the shoulder 463 on the associated accumulator rack so as to arrest the downward movement of said rack at its zero position and thus prevent it from accomplishing a carry over operation into the next higher order.

Printing unit

This unit comprises the hammer control mechanism, the hammer lock-out, and means for eliminating zeros to the left and right of significant figures.

The printing is accomplished by a firing pin 464 for each type bar which is operated to strike the aligned type 465 when the associated hammer 466 is released and thereupon propelled by its actuating spring 467, thus causing the type to print upon a record sheet mounted on the platen 468. Any well known type of paper and ribbon feed mechanisms may be employed in conjunction with said platen. The hammers 466 are mounted to swing about the shaft 469 and, after performing a printing operation, are restored by the common bail 470. This restoration is accomplished by a cam 471 (Fig. 2) mounted on the shaft 176a just inside the wall 37 and adapted to operate a follower 472 coupled to a crank 473 on the shaft 469. A second cam 474 on said shaft controls a follower 475 on the shaft 476 (Figs. 3 and 5) to rock said shaft and thereby, through its bell cranks 477, actuate the reciprocatory hammer release bail 478 to release the hammers at the moment the type bars have reached their printing position, as will presently be more fully explained. The bail 478 is thereafter restored by the springs 479 connected to the bell cranks 477.

To accomplish the release of the hammers, each has associated therewith a rockingly supported and vertically movable interposer 480 which, in the position of Fig. 1, is inoperative and permits the bail 478 to pass beneath the shoulder formed by the reduced lower end of the interposer so that the hammer 466 will not be released with the type bar in the blank position shown. However, should the type bar move upwardly and be arrested to align its uppermost or 0 type with the pin 464, this movement permits the lever 481, the rear end of which engages under a shoulder on said bar, to turn clockwise one step under the influence of the spring 482 connecting the same with its interposer 480. The forward end of said lever has a pin and slot connection with the interposer so that said movement will pull the latter downwardly to project its left edge of the enlarged portion thereof into the path of the bail 478. With the parts in the 0 printing position, the projection 483 on the interposer will, upon said downward movement, still be in alignment with the rear extremity of the zero elimination control lever 484 in its intermediate position. Said lever is pivoted to the hammer release plate 485 whose rear extremity 486 engages the hammer 466 to hold it in inoperative or restored position. With said lever and plate secured together by the pivotal connection therebetween, it will now be apparent that upon operation of the bail 478, the interposer 480 will be moved forwardly and its projection 483 will contact the rear extremity of the lever 484 to impart a similar movement to the latter and to said plate 485 to retract the end 486 of the latter from the hammer and thus permit it to fire and print a zero. Immediately thereafter, the bail 478 is retracted by the springs 479, the bail 470 restores the hammers 466 and, upon downward movement of the type bar, the lever 481 is rocked counterclockwise to lift the interposer 480 to its inoperative position, with the bail 487 attached to the bail 478 acting to restore the plate 485 and lever 484 so that the extremity 486 of said plate will again engage the hammer 466. Springs 488 connected to the plates 485 also aid in restoring them to hammer locking position.

Should the type bar, in its upward movement, be arrested in position to print a 1 or a digit of higher order, the upward movement of said bar will permit the lever 481 to move an additional step which will lower the interposer 480 sufficiently to align its projection 483 with a projection 489 on the plate 485 so that forward movement of the interposer under the influence of the bail 487 will cause the plate 485 to assume its hammer releasing position and, incidentally, carry its lever 484 with it.

*Zero elimination*

Zero elimination to the left or right is accomplished by, respectively, depressing or raising the front ends of the levers 484 from their intermediate positions, and said levers are all frictionally held in their three adjusted positions by the spring latches 490. When eliminating to the left in any group of columns to which a set of type bars is assigned, all levers 484 individual to said columns are depressed and, in so doing, the inner extremities of said levers will be elevated so that when the bail 478 is advanced to actuate the interposers 480 the projections 483 thereon will enter the spaces between said extremities and the projections 489 on the plates 485 and the latter will not, therefore, be advanced to release their respective hammers 466. However, a significant figure in any one of said columns will be printed because, in that case, the interposer 480 will be lowered to its second step, as previously described, and the projection 483 thereon will be aligned with the projection 489, thus causing the plate 485 to be advanced when the interposer is operated. The appearance of a significant figure in any one of said columns results in a zero being printed in the column or columns to the right of the first named column in which the zero would have otherwise been eliminated. This is accomplished by providing each of the levers 484 with a laterally offset and forwardly extending lug 491 projecting through and to the right of the plate 485 on which said lever is pivoted. When said lever is depressed, said lug 491 will be horizontally aligned with a rearwardly extending lug 492 formed on the plate to the right of said lever and offset to the left of said plate. Consequently, as the plate 485 individual to the significant figure to be printed is advanced to release its hammer, the lug 491 of the lever carried by said plate will contact the lug 492 on the plate to the right and thereby also advance the latter plate which will then release its hammer to print a zero. In the same manner, any other plate to the right of the last named plate which would normally eliminate the printing of a zero because of the depression of its lever, would be advanced, due to the presence of the mentioned significant figure, by the engagement of its lug 492 with the lug 491 of the lever carried by said last named plate, and a zero would therefore be printed because of the consequent advancement of said other plate.

Zero elimination to the right is effected by raising the levers 484 individual to the columns in which such elimination is to occur. This adjustment of the levers lowers their rear or inner extremities so that they are now positioned in overlapping relation to the projections 489 of their respective plates. When so located, the projections 483 on the associated interposers 480 will pass over the inner ends of said levers when the interposers have been lowered only one step by the levers 481 and then advanced by the bail 478. Therefore, each projection 483 will fail to engage either its lever 484 or its plate 485 and the latter will not be moved forwardly to release its hammer. When a significant figure is to be printed in one of said columns, the interposer 480 individual thereto is lowered sufficiently by the lever 481 to allow its projection 483 to align with the projection 489 on the associated plate 485 so that the latter will be operated to release its hammer when the bail 478 is advanced to actuate said interposer. The lever 484 of the plate which controls the printing of said significant figure effects the printing of a zero in the column to the left by means of the forwardly extending lug 493 on said lever, which lug is offset to the opposite side of the lever from the lug 491 thereon. Said lug 493, under the condition being described, is aligned with a rearwardly extending lug 494 on the plate 485 to the left of said lever and said lug 494 is offset in the opposite direction from the lug 492 on said plate and will therefore be horizontally aligned with said lug 493. Hence, when the plate which controls the printing of said significant figure is actuated to release its hammer, said lug 493 of the lever attached to said plate will engage said lug 494 on the plate to the left and operate the latter to also release its hammer so that a zero will be printed to the left of the significant figure. In a manner which will now be understood, a zero will be printed in any other column of the group under consideration which is to the left of that just described, by reason of the fact that the lug 493 of the lever to the right will engage the lug 494 of the plate individual to said other column and thus actuate said plate to release its hammer.

*Hammer lock-out*

The operation of locking out a hammer 466 occurs at the beginning of a listing cycle and before the type bars start their upward movement, and is effected by preventing downward movement of the associated interposer 480 which has been restored to the position shown at the conclusion of the previous cycle when the associated type bar depressed the adjacent end of the lever 481. Under this condition, the bail 478, when advanced, will pass under the shoulder formed in the adjacent edge of the interposer and will not operate the latter. To lock up the interposer, there is provided a detent 495 normally held in its inoperative position by the spring 496 so that its rear end will be held out of the path of the shoulder formed by the recess 497 in the adjacent edge of the interposer. A lock-out key 498 for each detent is free to turn on an oscillatory bail 499 and as the latter is swung to the left, as viewed in the drawings, and the key 498 is in its inoperative position as shown, a pin 500 on said key will ride over the upper edge of the detent and will not, therefore, urge the same rearwardly. However, when the key is pre-set by pushing it rearwardly about the bail 499 to engage the pin 500 in the notch 501 of the detent and said bail is then swung rearwardly at the beginning of the operating cycle, the rear end of the detent will enter the recess 497 to engage the mentioned shoulder formed thereby, and the interposer will therefore be held in its raised position and its associated hammer will not be fired.

The bail 499 is operated from a rock shaft 502 to which it is connected by links 503 at opposite ends of the bail. A section of said shaft 502 extends between the walls 37 and 37a and on this section thereof a cam 504 (Figs. 4, 5 and 12) on the shaft 176a controls the rocking action of said shaft 502. For this purpose, the follower bell crank 505 engages the under portion of said cam and is loosely mounted on said shaft 502, and is held in engagement with the cam 504 by the spring 506. A collar 507 pinned on said shaft 502 carries a clutch plate 508 and further has stop member 509 engageable with a rigid part 510 to limit clockwise turning movement of the shaft. A spring 511 urges said clutch plate clockwise. Pivoted to an intermediate portion of the bell crank 505 is a clutch pawl 512 the upper end of which is connected by a spring 513 to the upper extremity of the clutch plate 508. Said pawl 512 moves with the bell crank 505 and cooperates with the plate 508, in the position of Fig. 5, to turn the shaft 502 conterclockwise to thus swing the bail 499 rearwardly at the beginning of each cycle during listing operations. Upon initiation of a total-taking cycle, a solenoid 514 is energized to rock the bell crank 515 clockwise and thus, by its engagement with the lower end of the clutch pawl 512, trip said pawl to its inoperative position relative to the plate 508. The bell crank 505 will be operated by the cam 504, but since the pawl 512 will not now operate the plate 508 and since said bell crank is loose on the shaft 502, the latter will not be turned and the lock-out mechanism will not operate during said total-taking cycle, with the result that all hammers will be fired to print the totals. Upon de-energization of solenoid 514 and continued rotation of the cam 504, the pawl 512 will be restored by the spring 513 to its operative position relative to the clutch plate 508 so that upon next actuation of the bell crank 505 by the cam 504, the pawl will drive the plate 508 to again turn the shaft 502 to operate the lock-out mechanism.

What is claimed is:

1. In a tabulating machine, a record card analyzer, a plurality of type bars controlled in accordance with the analysis of record cards, change of designation mechanism controlled by said analyzer for initiating a total-taking cycle a transfer unit for transmitting data from said analyzer to said type bars and having main and auxiliary sections, transfer elements in both sections having operative and inoperative positions, a set-up device operatively associated with said transfer elements for setting preselected ones thereof in operative positions preliminary to and throughout successive operations of said change of designation mechanism, means controlled by said analyzer for actuating the operative transfer elements in said main section in accordance with the analysis of cards by said analyzer, means operated by the actuated transfer elements to control said type bars during listing operations, and means controlled independently of said analyzer for actuating transfer elements in said auxiliary section to variously control said type bars during a total-taking cycle.

2. In a tabulating machine, a record card analyzer, a plurality of type bars controlled in accordance with the analysis of record cards, change of designation mechanism controlled by said analyzer for initiating a total-taking cycle, a transfer unit for transmitting data from said analyzer to said type bars during listing cycles and having main and auxiliary sections, transfer elements in both sections having operative and inoperative positions, a set-up device operatively associated with said transfer elements for setting preselected ones thereof into operative positions preliminary to and throughout successive operations of said change of designation mechanism, means controlled by said analyzer for actuating the operative transfer elements in said main section in accordance with the analysis of cards by said analyzer, means operated by the actuated transfer elements to control said type bars during listing operations, and means operable upon actuation of said change of designation mechanism and independently of said analyzer controlled means for actuating transfer elements in said auxiliary section to suppress certain type bars during a total-taking cycle.

3. In a tabulating machine, a record card analyzer, a plurality of type bars controlled in accordance with the analysis of record cards, change of designation mechanism controlled by said analyzer for initating a total-taking cycle, a transfer unit for transmitting data from said analyzer to said type bars during listing cycles and having main and auxiliary sections, transfer elements in both sections having operative and inoperative positions, a set-up device operatively associated with said transfer elements for setting preselected ones thereof into operative positions preliminary to and throughout successive operations of said change of designation mechanism, means controlled by said analyzer for actuting the operative transfer elements in said main section in accordance with the analysis of cards by said analyzer, means operated by the actuated transfer elements to control said type bars during listing operations, and means operable upon initiation of a total-taking cycle and independently of said analyzer controlled means for actuating a transfer element in said auxiliary section to control the printing of different total designations by one of said type bars.

4. In a tabulating machine, a plurality of type bars, card analyzer and change of designation mechanisms, a transfer unit including a plurality of transfer elements having operative and inoperative positions, a set-up device operatively associated with said transfer elements and operable to selectively set certain of them to operative positions, analyzer controlled members for actuating certain of said operative transfer elements, a plurality of type bar controlling members arranged in crossed relation to said controlled members to define junction points at which said operative transfer elements are located for contact with said controlled and controlling members, certain of said controlling members being actuated by certain of said transfer elements for arresting certain of said type bars, and means rendered effective by the operation of said change of designation mechanism for actuating others of said operative transfer elements to control certain type bars through others of said controlling members.

5. In a tabulating machine, a plurality of type bars, card analyzer and change of designation mechanisms, a transfer unit including a plurality of transfer elements having operative and inoperative positions, a set-up device operable to selectively set certain of said transfer elements to operative positions preliminary to and throughout successive operations of said change of designation mechanism, analyzer controlled bars for actuating certain of said operative transfer elements, other bars responsive to an operation of said change of designation mechanism for actuating others of said operative transfer elements, type bar controlling bars arranged in crossed relation to said controlled and other bars and between which said operative transfer elements are located for actuation by said controlled and other bars, certain of said controlling bars being responsive to the actuation of the first named transfer elements by said controlled bars to arrest certain type bars, and means to actuate said other bars upon a change of designation to operate, through said other operative transfer elements, certain others of said controlling bars to differentially control others of said type bars.

6. In a tabulating machine, a plurality of type bars, a unit including a plurality of transfer elements therein for controlling said type bars, a controlled mechanism for actuating said transfer elements and including a plurality of bars, a mechanism associated with the latter bars for controlling the operation thereof and including a framework having a movable support for actuating one of the bars of said controlled mechanism by direct contact therewith, cam controlled means for moving said support, actuating members for certain other of the latter bars carried by said support, another actuating member carried by said framework for operating another of said latter bars, and independently and alternatively selectable elements movably supported by the last named actuating member, means to selectively move one of said elements and means to operate the selected element to actuate said last named actuating member.

7. In a tabulating machine, a type bar for printing different classes of total designations, a unit including a transfer element therein for controlling said type bar, an actuating bar for said transfer element, an operating member for said actuating bar, interposers supported by said operating member for movement to operative and inoperative positions relative thereto, means to move either of said interposer members to operative position depending upon the class of total designation to be printed, and means to thereupon actuate the operative interposer.

8. In a tabulating machine, a plurality of type bars, a unit including a plurality of transfer elements therein for controlling said type bars, a controlled mechanism for actuating said transfer elements and including a plurality of bars, a mechanism associated with the latter bars for controlling the operation thereof and including a support movable toward and away from said bars, an interposer for each bar carried by said support for actuating said bar when said support is moved in one direction and having movements to and from operative position relative to said bar, means to move said interposers into operative positions, and means to thereupon move said support to actuate said latter bars.

9. In a tabulating machine, a plurality of type bars assigned for total printing, control means for said type bars for suppressing the same, a controlled mechanism for operating said control means and including a plurality of operable members, means associated with said operable members for controlling the operation thereof and including a support movable toward and away from said members, a movable interposer for each operable member carried by said support and having a normally inoperative position relative to its operable member, means to move said interposers to operative position, and means to move said support to engage the operative interposers with their respective operable members to actuate said control means to suppress said type bars.

10. In a tabulating machine, a plurality of type bars for printing group indications, control means for suppressing said type bars, a controlled mechanism for operating the said control means when said type bars are to be suppressed and including a plurality of operable members, means associated with said operable members for controlling the operation thereof and including a support movable toward and away from said members, a movable interposer for each operable member carried by said support and having a normally operative position relative to its associated member, and means to move said interposers to their inoperative positions to prevent actuation of said operable members.

11. In a tabulating machine, a plurality of type bars, a control unit therefor comprising a plurality of type bar controlling members and other operable members arranged in crossed relation to said controlling members and defining junction points therebetween, transfer elements operatively positioned between said controlling and operable members at said junction points for actuating said controlling members to control said type bars when said operable members are actuated, a controlled mechanism for said operable members comprising a support periodically movable into and out of operative relation to said operable members, means to so move said support, interposers for certain of said operable members movable with said support and also relative thereto and having normally inoperative positions with respect to certain operable members, and means to move said interposers to operative positions so as to actuate the associated operable members when said support is moved into operative relation thereto.

12. In a tabulating machine, a plurality of type bars, a control unit therefor comprising a plurality of type bar controlling members and other operable members arranged in crossed relation to said controlling members and defining junction points therebetween, transfer elements operatively positioned between said controlling and operable members at said junction points for actuating the first named members to control said type bars when said operable members are actuated, a controlled mechanism for said operable members comprising a support periodically movable into and out of operative relation to said operable members, means to so move said support, interposers for certain of said operable members movable with said support and also relative thereto and having normally operative positions relative to certain of said operable members, and means to move said interposers to their inoperative positions to prevent actuation of the associated operable members.

13. In a tabulating machine, a plurality of type bars, a control unit therefor comprising a plurality of type bar controlling members and other operable members arranged in crossed relation to said controlling members and defining junction points therebetween, sectional transfer elements operatively positioned between said controlling and operable members at said junction points, sections of said transfer elements being normally in inoperative position and associated other sections being in operative position, a movable set-up plate through which said normally inoperative sections extend and having means, when said plate is moved, to selectively set certain normally inoperative sections to operative positions relative to said associated other sections while leaving the remainder of said inoperative sections in normal position, a controlled mechanism for operating said operable members to thereby actuate the operatively set sections of said transfer elements to control through the associated other sections the operation of certain of said said type bar controlling members, said mechanism comprising a support periodically movable into and out of operative relation to said operable members, means to so move said support, interposers for certain of said operable members movable with said support and also relative thereto and having normally inoperative positions with respect to said certain operable members, and means to move said interposers to operative positions so as to actuate the associated operable members when said support is moved into operative relation thereto.

14. In a tabulating machine, a plurality of type bars, a conrol unit therefor comprising a plurality of type bar controlling members and other operable members arranged in crossed relation to said controlling members and defining junction points therebetween, sectional transfer elements operatively positioned between said controlling and operable members at said junction points, sections of said transfer elements being normally in inoperative position and associated other sections being in operative position, a movable set-up plate through which said normally inoperative sections extend and having means, when said plate is moved, to selectively set certain normally inoperative sections to operative positions relative to said associated other sections while leaving the remainder of said inoperative sections in normal position, a controlled mechanism for operating said operable members to thereby actuate the operatively set sections of said transfer elements to control through the associated other sections the operation of certain of said type bar controlling members, said mechanism comprising a support periodically movable into and out of operative relation to said operable members, means to so move said support, interposers for certain of said operable members movable with said support and also relative thereto and having normally operative positions relative to certain of said operable members, and means to move said interposers to their inoperative positions to prevent actuation of the associated operable members.

15. In a tabulating machine, a plurality of type bars, a control unit therefor comprising a plurality of type bar controlling members one for each type bar and operatively associated therewith, a lesser plurality of operable members in said unit arranged in crossed relation to said controlling members to define junction points therebetween and each capable of operating a plurality of said controlling members, transfer elements selectively engageable with said operable members and certain of said controlling members at said junction points to render effective said operable members, a controlled mechanism for actuating said operable members comprising a cam shaft, a support movable toward and away from said operable members upon each rotation of said shaft, means for so moving said support including a lever controlled by said cam shaft and operatively associated with said support to move the latter toward said operable members, interposers carried by said support and having normally inoperative positions relative to certain of said operable members, other interposers also carried by said support and having normally operative positions relative to certain other operable members, means to move said interposers, respectively, to operative and inoperative positions, and levers controlled by said cam shaft to operate said interposers, when in operative position, to engage them with the associated operable members to actuate the same.

WILLIAM WOCKENFUSS.

REFERENCES CITED

The following references are of record in the file of this patent:

UNITED STATES PATENTS

| Number | Name | Date |
|---|---|---|
| 2,381,361 | Mueller | Aug. 7, 1945 |